(12) United States Patent
Noel

(10) Patent No.: US 8,115,977 B2
(45) Date of Patent: Feb. 14, 2012

(54) DOCUMENT COLOR AND SHADES OF GRAY OPTIMIZATION USING MONOCHROME PATTERNS

(75) Inventor: Michael Jonathan Noel, Phoenix, AZ (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 734 days.

(21) Appl. No.: 11/162,385

(22) Filed: Sep. 8, 2005

(65) Prior Publication Data
US 2005/0280874 A1 Dec. 22, 2005

(51) Int. Cl.
G03F 3/08 (2006.01)
(52) U.S. Cl. .......... 358/518; 358/1.9; 358/2.1; 345/418
(58) Field of Classification Search .......... 358/518, 358/1.9, 2.1; 345/418
See application file for complete search history.

(56) References Cited

U.S. PATENT DOCUMENTS

| | | |
|---|---|---|
| 3,807,852 A | 4/1974 | Hoydic |
| 4,225,861 A | 9/1980 | Langdon, Jr. et al. |
| 4,308,553 A | 12/1981 | Roetling |
| 4,499,489 A | 2/1985 | Gall et al. |
| 4,688,031 A * | 8/1987 | Haggerty ............ 345/600 |
| 4,700,235 A | 10/1987 | Gall |
| 4,703,318 A | 10/1987 | Haggerty |
| 4,741,046 A | 4/1988 | Matsunawa et al. |
| 4,888,713 A | 12/1989 | Falk |
| 4,970,586 A | 11/1990 | Sunda et al. |
| 5,075,787 A | 12/1991 | Shaughnessy et al. |
| 5,098,817 A | 3/1992 | Voorhees |
| 5,136,401 A | 8/1992 | Yamamoto et al. |
| 5,138,465 A | 8/1992 | Ng et al. |
| 5,142,337 A | 8/1992 | Karidis et al. |
| 5,153,576 A | 10/1992 | Harrington |
| 5,153,739 A | 10/1992 | Laman et al. |
| 5,216,498 A | 6/1993 | Matsunawa et al. |
| 5,220,417 A | 6/1993 | Sugiura |
| 5,291,243 A | 3/1994 | Heckman et al. |
| 5,309,554 A | 5/1994 | Ito |
| 5,457,772 A | 10/1995 | Shannon |
| 5,557,430 A | 9/1996 | Isemura et al. |
| 5,563,991 A | 10/1996 | Mahoney |
| 5,568,248 A | 10/1996 | Wagley |
| 5,621,816 A | 4/1997 | Ruppert |
| 5,673,121 A | 9/1997 | Wang |
| 5,691,827 A | 11/1997 | Kamei et al. |
| 5,701,401 A * | 12/1997 | Harrington et al. ............ 358/1.9 |
| 5,713,019 A | 1/1998 | Keaten |
| 5,726,781 A | 3/1998 | Isemura et al. |
| 5,748,345 A | 5/1998 | Ozaki et al. |
| 5,751,921 A | 5/1998 | Fujimoto |
| 5,781,730 A | 7/1998 | Reimer et al. ................ 709/203 |
| 5,812,744 A | 9/1998 | Allebach et al. |
| 5,818,966 A | 10/1998 | Prasad et al. |

(Continued)

*Primary Examiner* — Twyler Haskins
*Assistant Examiner* — Michael Burleson
(74) *Attorney, Agent, or Firm* — Sergey G. Zaytsev

(57) ABSTRACT

Methods, apparatus, software, and systems of the present invention allow for optimization of color and shades of gray documents prior to their conversion to a monochrome format. If color/gray elements are identified in the document, the distance between them and their intensity is determined. If there are elements with the same or similar intensity in close proximity to each other, colors of some of the elements may be replaced with solid monochrome colors, and/or dithered surfaces, and/or monochrome patterns. Further, the elements may be outlined. These improvements make elements in the document more distinguishable after its conversion to a monochrome format. The described color optimization and outlining may have wide applicability in the Internet Fax technology.

58 Claims, 17 Drawing Sheets

Document A

Document B

U.S. PATENT DOCUMENTS

| | | | |
|---|---|---|---|
| 5,844,542 A | 12/1998 | Inoue et al. .................... 345/594 |
| 5,859,637 A | 1/1999 | Tidwell, II .................... 715/708 |
| 5,874,988 A | 2/1999 | Gu .................... 348/97 |
| 5,896,121 A | 4/1999 | Kafer |
| 5,918,238 A | 6/1999 | Hayashi |
| 5,933,549 A | 8/1999 | Ide et al. .................... 382/309 |
| 5,956,468 A | 9/1999 | Ancin |
| 5,990,901 A | 11/1999 | Lawton et al. .................... 345/581 |
| 5,999,644 A | 12/1999 | Sugiura |
| 6,008,913 A | 12/1999 | Yoshida |
| 6,015,207 A | 1/2000 | Winter et al. |
| 6,016,354 A | 1/2000 | Lin et al. |
| 6,031,543 A | 2/2000 | Miyashita et al. .......... 345/593 |
| 6,046,741 A | 4/2000 | Hochmuth .................... 715/704 |
| 6,169,607 B1 | 1/2001 | Harrington |
| 6,178,272 B1 | 1/2001 | Segman .................... 382/298 |
| 6,179,485 B1 * | 1/2001 | Harrington .................... 358/1.9 |
| 6,243,070 B1 | 6/2001 | Hill et al. .................... 345/589 |
| 6,252,577 B1 | 6/2001 | Rashkovskiy et al. ........ 345/670 |
| 6,272,261 B1 | 8/2001 | Matsuoka .................... 382/276 |
| 6,278,434 B1 | 8/2001 | Hill et al. .................... 345/660 |
| 6,285,784 B1 | 9/2001 | Spaulding et al. .......... 382/162 |
| 6,330,068 B1 | 12/2001 | Matsuyama ................ 358/1.14 |
| 6,333,752 B1 | 12/2001 | Hasegawa et al. ........... 715/764 |
| 6,337,692 B1 | 1/2002 | Rai et al. .................... 345/594 |
| 6,369,787 B1 | 4/2002 | Wu et al. .................... 345/87 |
| 6,396,505 B1 | 5/2002 | Lui et al. .................... 345/613 |
| 6,538,769 B2 | 3/2003 | Yoshida et al. |
| 6,545,768 B1 | 4/2003 | Matsubara et al. |
| 6,571,051 B2 | 5/2003 | Savoie .................... 386/55 |
| 6,590,584 B1 | 7/2003 | Yamaura et al. ............. 715/704 |
| 6,611,355 B1 | 8/2003 | Kizawa |
| 6,611,358 B1 | 8/2003 | Narayanaswamy |
| 6,888,552 B2 | 5/2005 | Debevec et al. ............ 345/589 |
| 6,891,550 B1 | 5/2005 | Nolan .................... 345/619 |
| 6,914,612 B2 | 7/2005 | Hino et al. .................... 345/582 |
| 6,927,777 B2 | 8/2005 | Kitsutaka .................... 345/582 |
| 6,957,008 B1 | 10/2005 | Yasui .................... 386/55 |
| 6,977,662 B2 | 12/2005 | Sharman .................... 345/589 |
| 7,305,120 B2 | 12/2007 | Li |
| 2002/0003897 A1 | 1/2002 | Tanaka |
| 2002/0146173 A1 | 10/2002 | Herley |
| 2002/0149578 A1 * | 10/2002 | Atkins .................... 345/418 |
| 2004/0080789 A1 * | 4/2004 | Anderson .................... 358/2.1 |
| 2004/0114186 A1 * | 6/2004 | Fan .................... 358/2.1 |
| 2004/0117736 A1 | 6/2004 | Newman |
| 2004/0257378 A1 | 12/2004 | Braun et al. |
| 2006/0044578 A1 | 3/2006 | Porikli |
| 2006/0092483 A1 | 5/2006 | Lowman et al. |

* cited by examiner

DOCUMENT COLOR AND SHADES OF GRAY OPTIMIZATION USING MONOCHROME PATTERNS

CROSS REFERENCE TO RELATED PATENT APPLICATIONS

This patent application is related to the following patent applications concurrently filed herewith, all assigned to The Go Daddy Group, Inc:

U.S. patent application Ser. No. 11/162,379, "DOCUMENT COLOR AND SHADES OF GRAY OPTIMIZATION USING SOLID MONOCHROME COLORS."

U.S. patent application Ser. No. 11/162,382, "DOCUMENT COLOR AND SHADES OF GRAY OPTIMIZATION USING SOLID MONOCHROME SURFACES."

U.S. patent application Ser. No. 11/162,390, "DOCUMENT COLOR AND SHADES OF GRAY OPTIMIZATION USING OUTLINING."

FIELD OF THE INVENTION

The present invention relates in general to methods, apparatus, software, and systems for document color optimization and in particular to color optimization for Internet facsimile (fax) technology.

BACKGROUND OF THE INVENTION

Facsimile (or fax) technology is one of the most widely used forms of communication between companies and individuals. Notwithstanding the continuous growth of the popularity of email communications, the fax still holds a strong position as a reliable means of communication. It is presently estimated that more companies in the world have a fax number than an email address.

Among the advantages of fax communications are immediate delivery of documents, ability to transmit graphical documents, interoperability of fax devices throughout the world, improved security over email, and easy to use.

Traditional fax technology utilizes Public Switched Telephone Network (PSTN), also called Global Switched Telephone Network (GSTN), to transfer data between fax devices. Traditional fax devices comply with a variety of protocols, among which are: T.4—"Standardization of Group 3 Facsimile Apparatus for Document Transmission", ITU-T (CCITT), July 1996; T.6—"Facsimile Coding Schemes and Coding Control Functions for Group 4 Facsimile Apparatus", ITU-T (CCITT), November 1988; and T.30—"Procedures for Document Facsimile Transmission in the General Switched Telephone Network", ITU-T (CCITT), July 1996; all are hereby incorporated in their entirety by reference.

Internet Fax (I-Fax) is a term used to describe extensions of the traditional fax technology that allow the use of the Internet for fax transmission. Examples of I-Fax are fax-over-IP and fax-through-email. Among the standards recommended for use in I-Fax are: T.37—"Procedures for the transfer of facsimile data via store-and-forward on the Internet", ITU-T (CCITT), June 1998; T.38—"Procedures for real-time Group 3 facsimile communication over IP networks", ITU-T (CCITT), 1998; F.185—"Internet facsimile: Guidelines for the support of the communication of facsimile documents", ITU-T (CCITT), 1998; RFC 2301—"File Format for Internet Fax", IETF, March 1998; RFC 2302—"Tag Image File Format (TIFF)—image/tiff MIME Sub-type Registration", IETF, March 1998; RFC 3191—"Minimal GSTN address format in Internet Mail", IETF, October 2001 (obsoletes RFC 2303, March 1998; updates RFC 2846, June 2000); RFC 3192—"Minimal FAX address format in Internet Mail", IETF, October 2001 (obsoletes RFC 2304, March 1998; updates RFC 2846, June 2000); RFC 3965—"A Simple Mode of Facsimile Using Internet Mail", IETF, December 2004 (obsoletes RFC 2305, March 1998); RFC 2306—"Tag Image File Format (TIFF)—F Profile for Facsimile", IETF, March 1998; RFC 2542—"Terminology and Goals for Internet Fax", IETF, March 1999; and RFC 3297—"Content Negotiation for Messaging Services based on Email", IETF, July 2002; all are hereby incorporated in their entirety by reference.

Advanced capabilities of Internet Fax, such as color fax transmissions, are described, inter alia, in RFC 2531—"Content Feature Schema for Internet Fax", IETF, March 1999 and RFC 2532—"Extended Facsimile Using Internet Mail", IETF, March 1999; all are hereby incorporated in their entirety by reference.

In a conventional fax-through-email system, a fax service provider receives a fax transmission over the PSTN, converts the received fax transmission to a computer-readable file, e.g. TIFF or PDF (Portable Document Format), and forwards the file to the intended fax recipient via email. If a user sends a fax, the user provides document(s) to be faxed to the fax service provider via email, website, or software. The documents typically are computer-readable files. The fax service provider converts the document(s) to a faxable format (typically 1-bit black and white images), and transmits them to the recipient over the PSTN.

Presently, the majority of fax devices only support transmission of 1-bit black and white (monochrome) images. Thus, black and white faxes constitute the vast majority of all faxes transmitted. If the user's files to be faxed contain colors or shades of gray (hereinafter, the term color includes shades of gray), the colors will be typically converted to 1-bit black and white for compatibility with the majority of fax devices. At present, colors are either converted to black or dithered. Dithering is a method of simulating colors by producing black dots/pixels to represent brightness of the original color (similar to halftoning in newspaper photographs). Dithering will transform light colors to fewer dots with larger distances between them. The darker colors will be represented by more dots positioned closer to each other (additionally the size of the dots may be increased).

Various algorithms have been developed to produce a dithered image that more closely resembles the original image. Among them are error diffusion (dispersion, distribution) algorithms, which dither the image by diffusing the quantization error of a pixel to its neighboring pixels (e.g. the Floyd-Steinberg dithering algorithm).

Various colors with the same or similar brightness may look the same after dithering. Referring to FIG. 1, three elements of document A having various colors (represented by different line patterns) may look virtually undistinguishable after dithering in document B. Similarly, a fax document with a colored text on a colored background may become unreadable if the brightness of the text color is similar to the brightness of the background color (FIGS. 6 and 7).

Therefore, new methods, apparatus, software, and systems are needed to provide document optimization prior to their conversion to black and white. Additionally, new methods, apparatus, software, and systems are needed to provide document optimization for use in fax technology.

SUMMARY OF THE INVENTION

The limitations cited above and others are substantially overcome through the methods, apparatus, software, and systems disclosed herein. The methods, apparatus, software, and systems of the present invention allow for document optimization prior to its conversion to black and white.

A sample embodiment of the invention discloses a method that determines the presence of color and/or shades of gray elements in the document. The method further replaces some of the color and/or shades of gray elements with black or white.

Alternatively, the method replaces color elements with dithered surfaces of intensity greater or lesser than the intensity of the original color.

Alternatively, the method replaces color elements with monochrome patterns.

Alternatively, the method outlines some color elements in the document.

Further, the method may combine color replacement with outlining of some color elements.

Additionally, if the color optimization is performed on a document to be faxed, the method may comprise the steps of obtaining the document from the sender, optimizing the document, converting the document to a fax-compliant format, and sending the document.

Further, apparatus, software, and systems are provided for use with the described methods.

The above features and advantages of the present invention will be better understood from the following detailed description taken in conjunction with the accompanying drawings.

BRIEF DESCRIPTION OF THE DRAWINGS

FIG. 1 is a diagram illustrating conventional dithering. The elements having various colors in Document A (the colors are represented by various patterns in the drawing) may become indistinguishable after conventional dithering in Document B if the intensity (brightness) of the original colors are similar.

DETAILED DESCRIPTION AND PREFERRED EMBODIMENT

Figure 1:
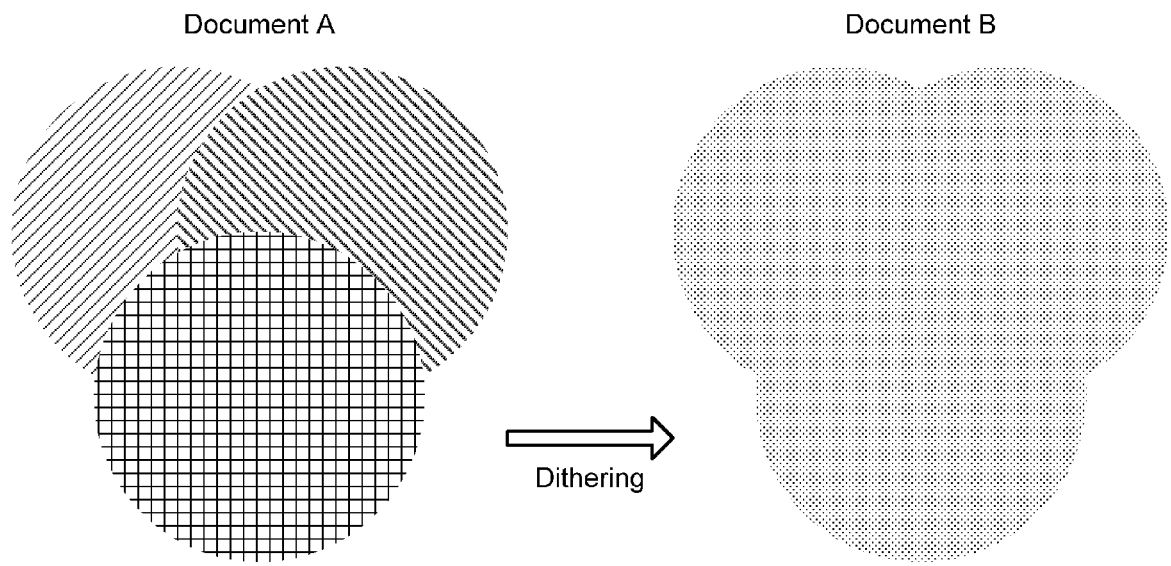

The present invention will now be discussed in detail with regard to the attached drawing figures which were briefly described above. In the following description, numerous specific details are set forth illustrating the Applicant's best mode for practicing the invention and enabling one of ordinary skill in the art of making and using the invention. It will be obvious, however, to one skilled in the art that the present invention may be practiced without many of these specific details. In other instances, well-known machines and method steps have not been described in particular detail in order to avoid unnecessarily obscuring the present invention. Unless otherwise indicated, like parts and method steps are referred to with like reference numerals.

For the purposes of this application a monochrome document (or a document in a monochrome format) is a document where color depth equals one. It can be a black and white document, where white is the background color and black is fore color, or any other combination of colors, e.g. monochrome document of blue on red background.

For the purposes of this application a black and white document means any monochrome document. Thus, the colors black and white may be replaced with any other color combination. Additionally, terms fore color (e.g. black) and background color (e.g. white) may be used.

For the purposes of this application the term color includes shades of gray.

Intensity of the color may be characterized through its brightness. E.g. the intensity of the color black may be assigned a value of 0 (or 0%) and the intensity of the color white may be assigned a value 1 (or 100%). Intensity of the color, represented through RGB (red, green, and blue) channels, may be calculated as:

$$I = \frac{\frac{R}{R_{Max}} + \frac{G}{G_{Max}} + \frac{B}{B_{Max}}}{3}$$

Alternatively, intensity of the color may be characterized through the darkness of the color (reciprocal value of the above formula).

If the color is represented through HSB (hue, saturation, and brightness) channels, the brightness value may be used.

The intensity of the dithered surface may be characterized through its darkness, e.g. intensity of the dithered area fully covered in black may be assigned a value of 1 (or 100%) and the intensity of area without color may be assigned a value 0 (or 0%). Intensity of the dithered surface may be calculated as the surface area covered by the color black divided by the total area of the dithered surface. The intensity for monochrome patterns may be similarly calculated.

Alternatively, intensity of the dithered surface may be characterized through its brightness and calculated as surface area not covered by fore color divided by the total area of the dithered surface.

In the following examples, when intensity of an original color is compared to intensity of a dithered surface or a monochrome pattern, the intensities are calculated based on darkness.

The methods of the present invention provide for distortion of the original documents (inter alia images) by replacing original colors with monochrome solid colors, monochrome dithered surfaces, or monochrome patterns, where dithered surfaces and monochrome patterns may have intensity equal or different from the intensity of the original colors. Further, the methods provide for outlining of some colors or some document elements.

Figure 2:
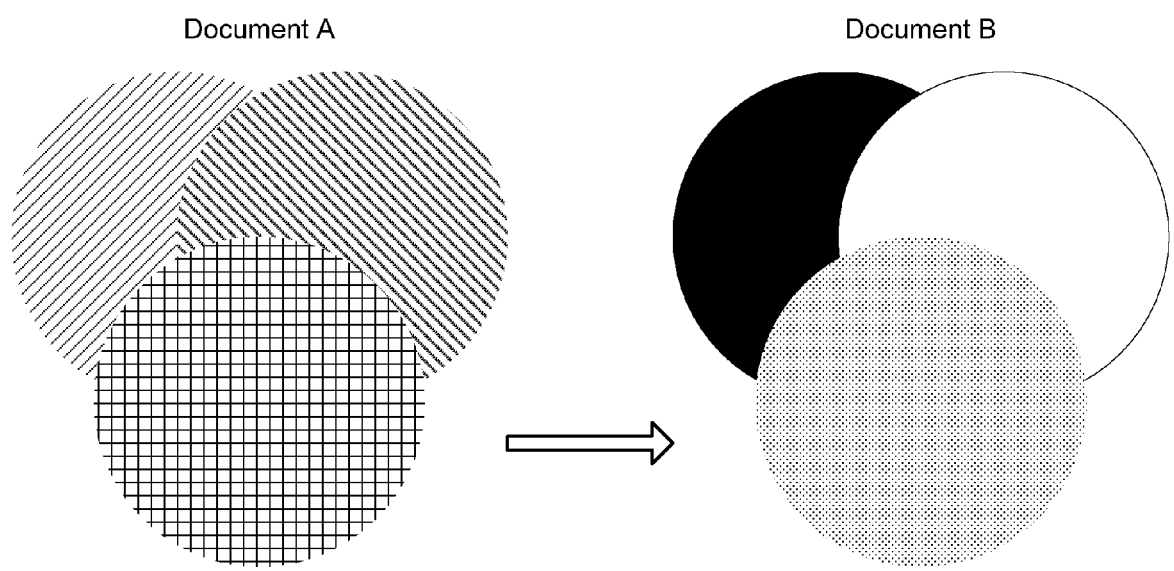
FIG. 2 illustrates color optimization, where some colors of Document A may be replaced with solid black or white colors in Document B.

FIGS. 2-5 and 8-18 demonstrate various sample results of color optimization and outlining achieved by the methods disclosed in the present invention. FIG. 2 demonstrates a replacement of some color elements of the original document with solid colors (black and/or white). Without the color optimization, the elements would be indistinguishable as shown in FIG. 1. Further, the element replaced with a solid white color in FIG. 2 is outlined with a solid black line to mark the boundaries of the element on the white background.

Figure 3:
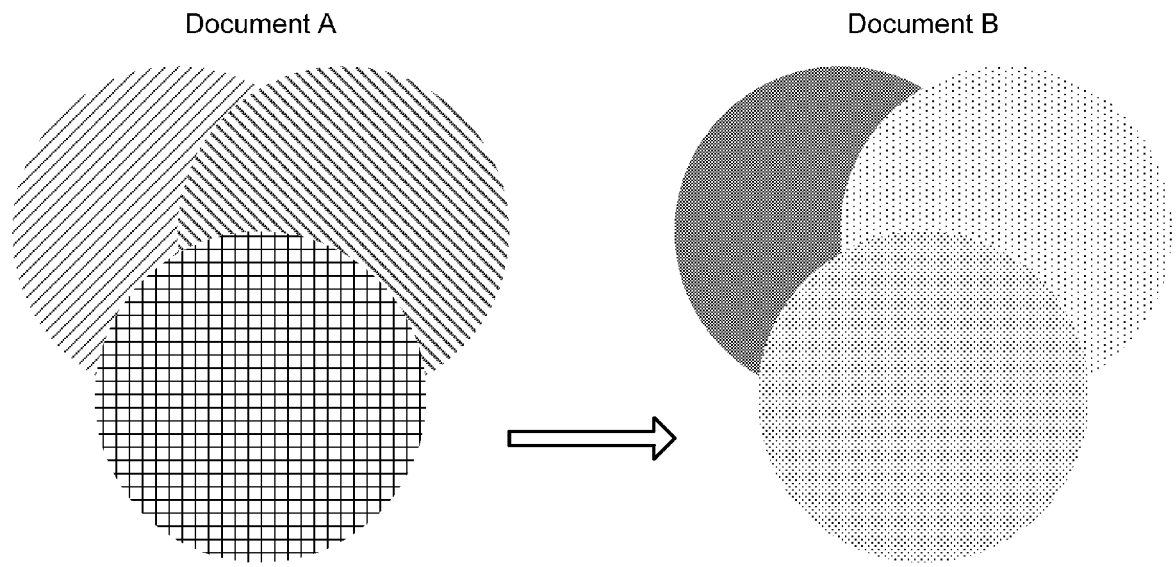
FIG. 3 illustrates dithering with color optimization, where some colors of Document A may be replaced with the dithered surfaces of greater or lesser intensity than the original colors.
Figure 4:
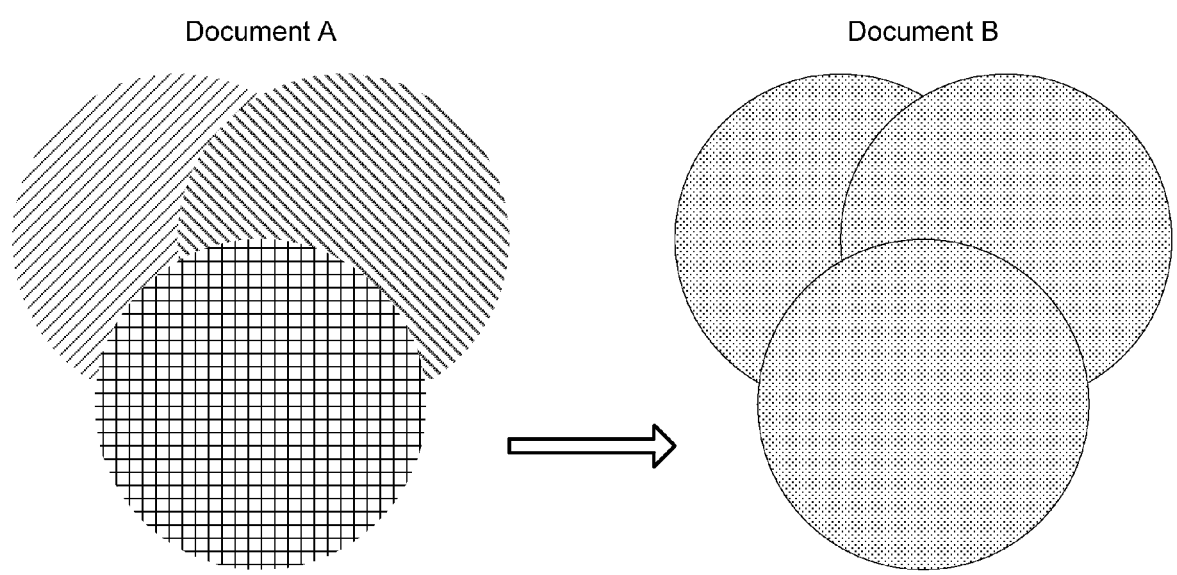
FIG. 4 illustrates dithering with outlining of the color elements and no color optimization.
Figure 5:
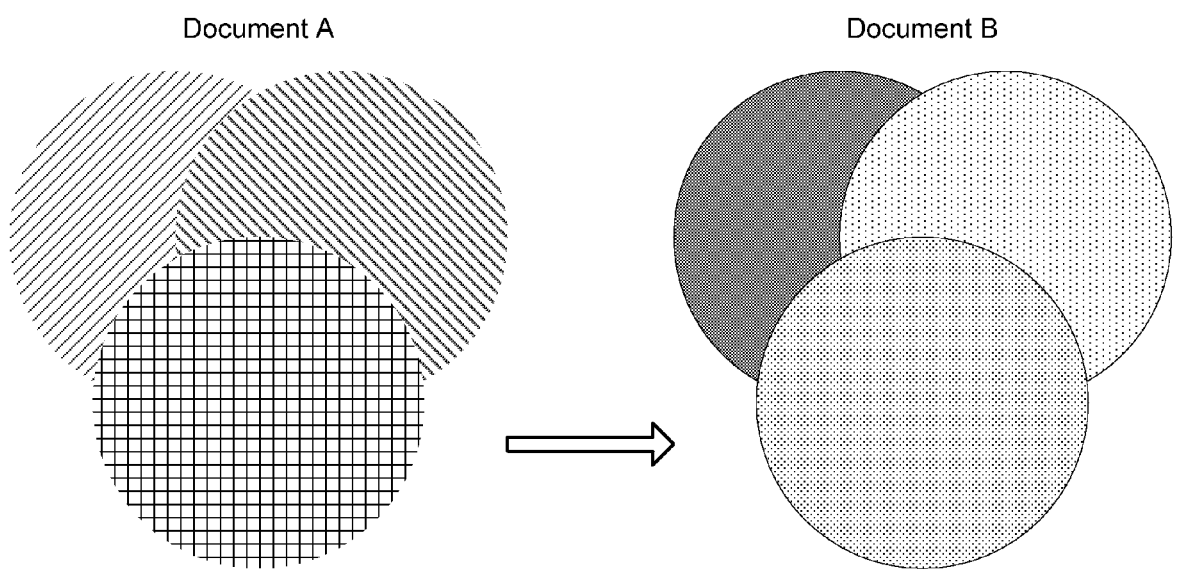
FIG. 5 illustrates dithering with color optimization, where some colors of Document A may be replaced with the dithered surfaces of greater or lesser intensity than the original colors and color elements may be outlined.

FIG. 3 illustrates a color optimization using dithered surfaces, where the optimized dithered surfaces have an intensity different from the intensity of the original color. FIG. 4 demonstrates dithering with the intensity correlated (same or similar) to the intensity of the original color, and where the elements of the document are outlined. FIG. 5 demonstrates color optimization using dithered surfaces with outlining of some or all document elements. Some elements optimized using dithered surfaces have intensities different from the intensities of the original colors.

Figure 6:
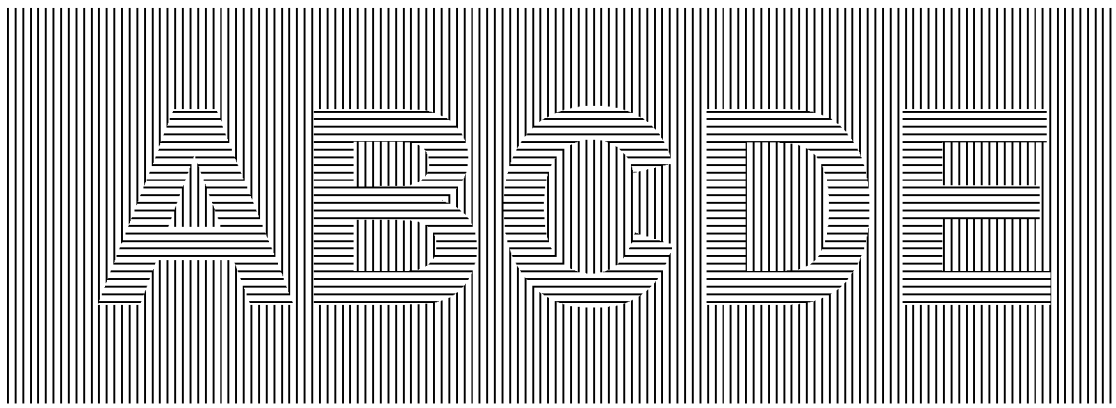
FIG. 6 illustrates an original document (before dithering, color optimization, or outlining) comprising color text on a color background (the text color is represented by horizontal lines pattern and the background color is represented by vertical lines pattern).
Figure 7:
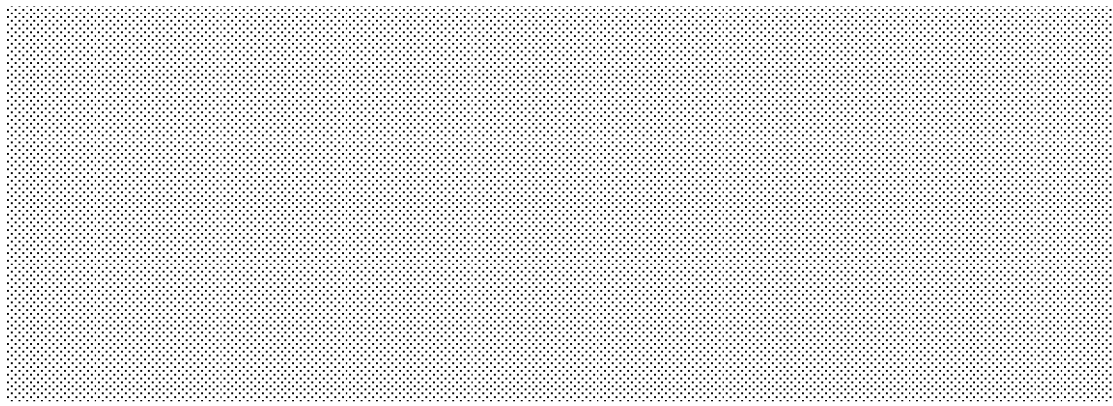
FIG. 7 illustrates a document after conventional dithering. The text becomes unreadable if the colors of the text and background are the same or similar intensity.
Figure 8:
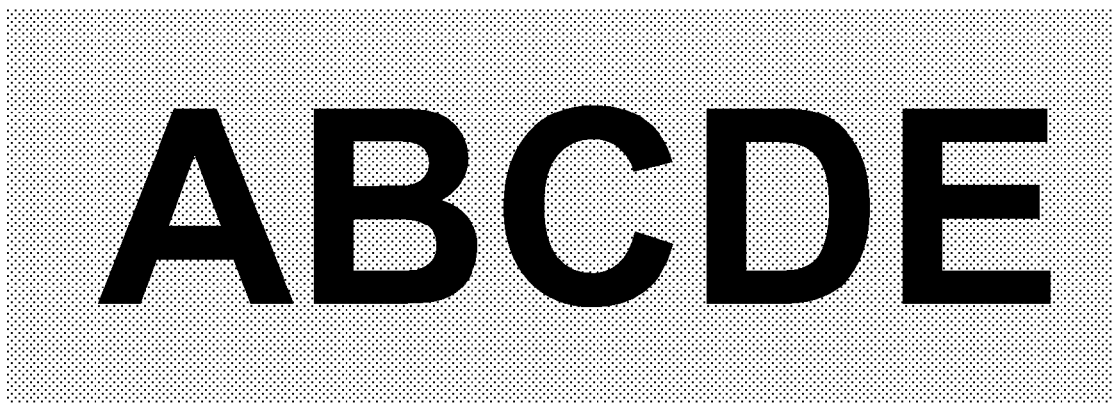
FIG. 8 illustrates a document after dithering with color optimization, where the text color was replaced with a solid black color.
Figure 10:
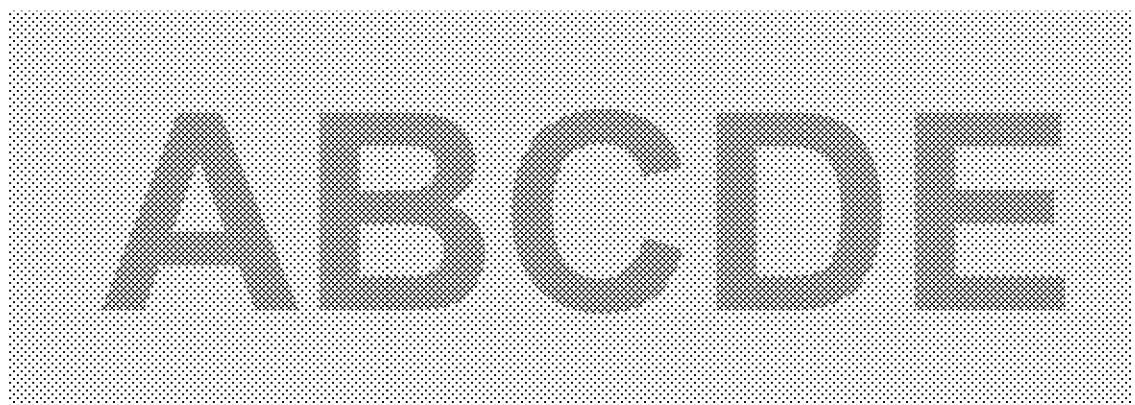
FIG. 10 illustrates a document after dithering with color optimization, where the text color was dithered with intensity greater than the intensity of the color in the original document.
Figure 11:
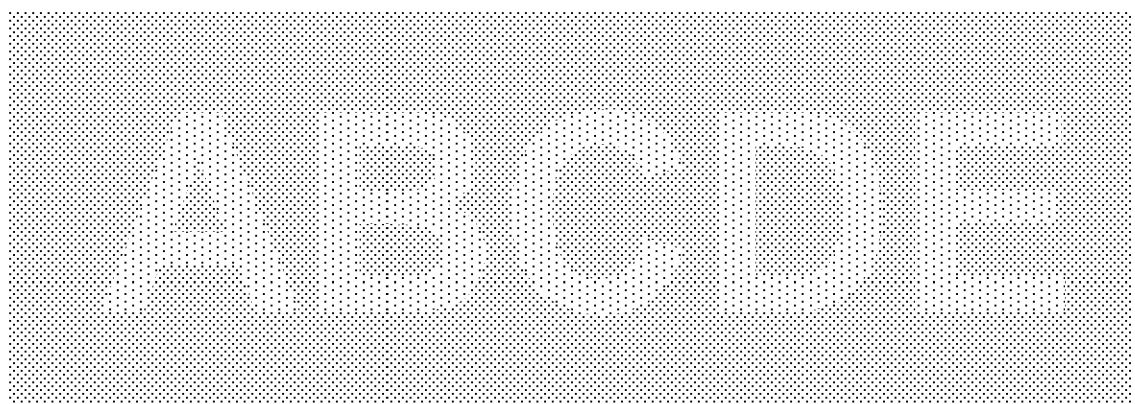
FIG. 11 illustrates a document after dithering with color optimization, where the text color was dithered with intensity lesser than the intensity of the color in the original document.

FIG. 6 represents an original document having colored text (depicted by a pattern of horizontal lines) on the colored background (depicted by vertical lines pattern). FIG. 7 demonstrates the result of a conventional color transformation using dithering to a monochrome document. Because the intensities of the text and background colors are the same or similar, the text becomes unreadable in the resulting document. FIG. 8 represents a result of color optimization and dithering. The text color was replaced with the solid black color. Similarly, referring to FIG. 9 the text color was replaced with the solid white color. Alternatively, the text color may be replaced with a dithered surface of intensity, which is greater or lesser (i.e. darker or lighter) than the intensity of the color in the original document (FIGS. 10 and 11).

Figure 12:
FIG. 12 illustrates a document after dithering with color optimization, where the background color was replaced with a solid black color.
Figure 13:
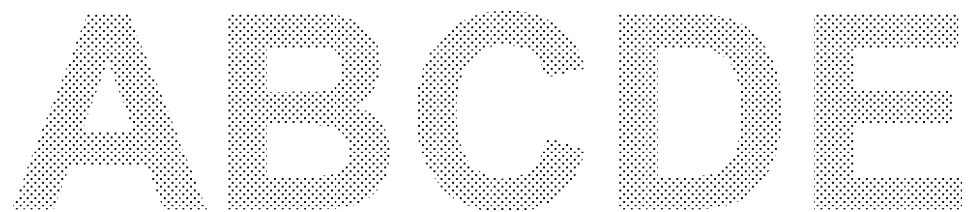
FIG. 13 illustrates a document after dithering with color optimization, where the background color was replaced with a solid white color.

Further, the background color may be replaced with a solid color, e.g. black color in FIG. 12 and white color in FIG. 13.

Figure 14:
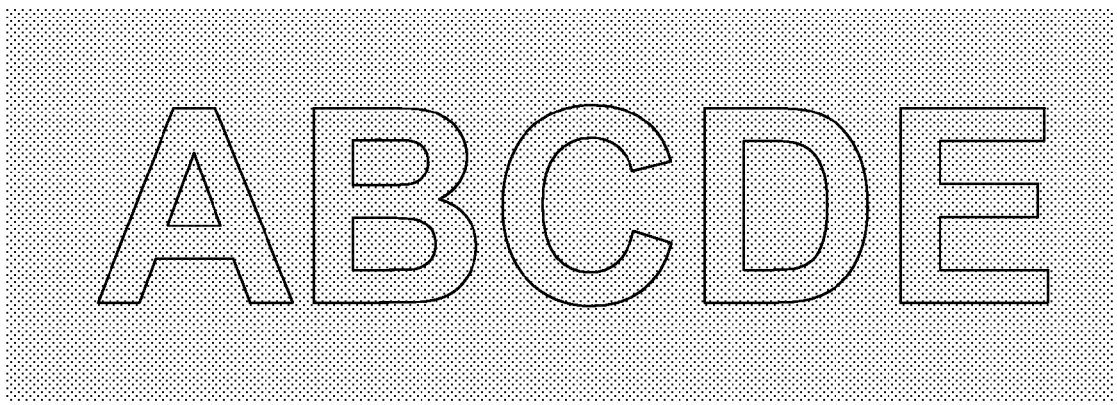
FIG. 14 illustrates a document after dithering with outlining, where the text color was outlined.
Figure 15:
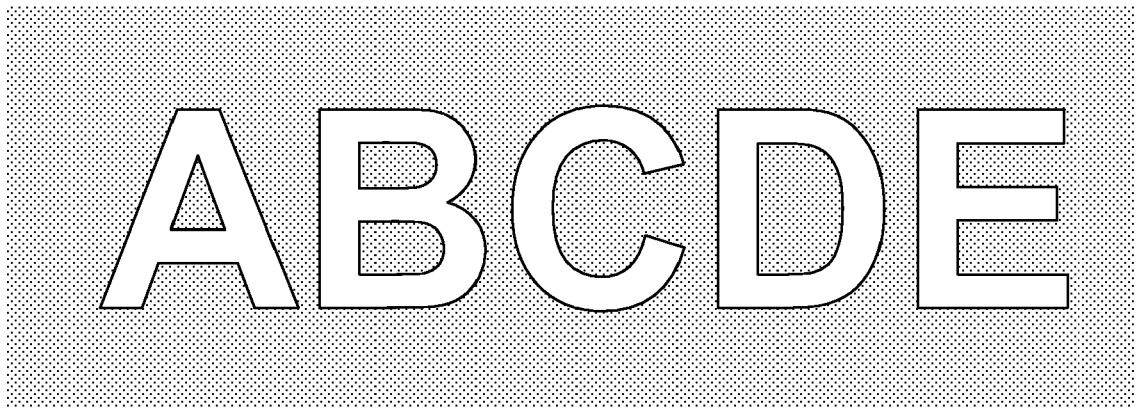
FIG. 15 illustrates a document after dithering with color optimization and outlining, where the text color was replaced with a solid white color and outlined.

Alternatively, the text may be outlined as shown in FIG. 14 or outlined and replaced with a solid color (e.g. white) as shown in FIG. 15.

Figure 16:
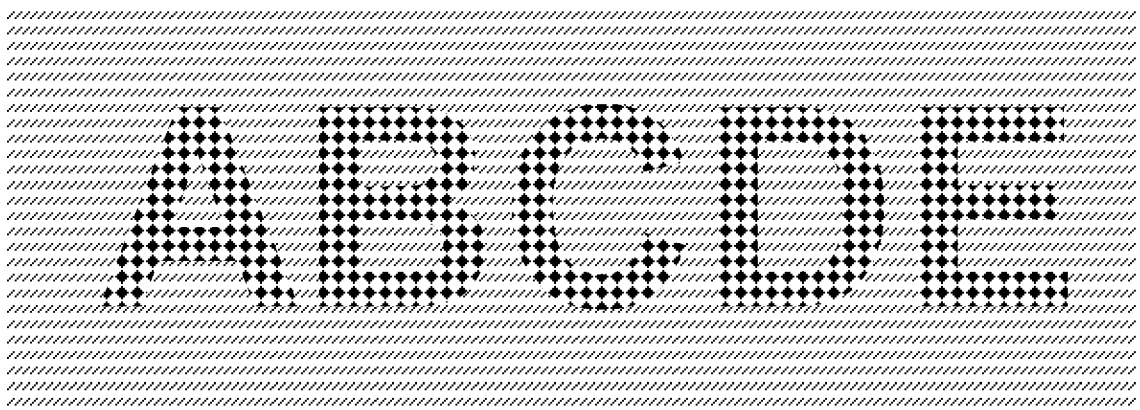
FIG. 16 illustrates a document after color optimization, where the colors were replaced with monochrome patterns.
Figure 17:
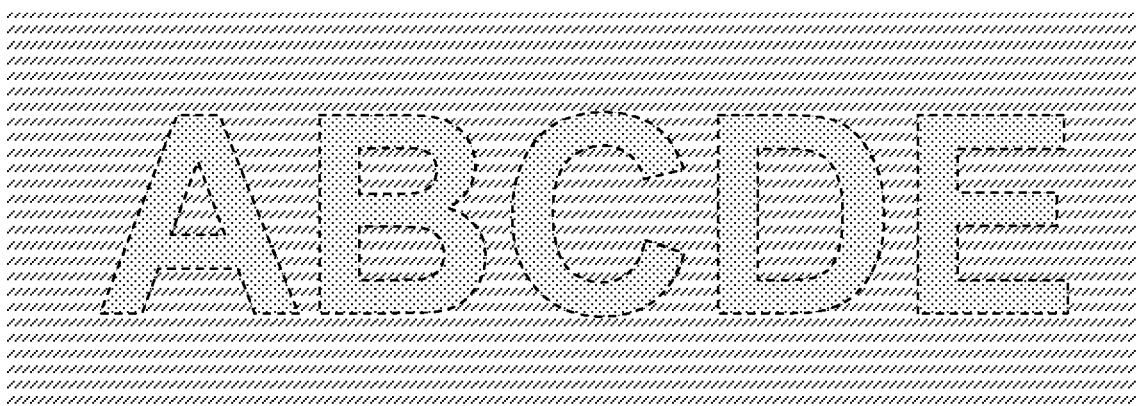
FIG. 17 illustrates a document after dithering with color optimization and outlining, where the background color was replaced with a monochrome pattern and the text was outlined with interrupted (dashed) lines.
Figure 18:
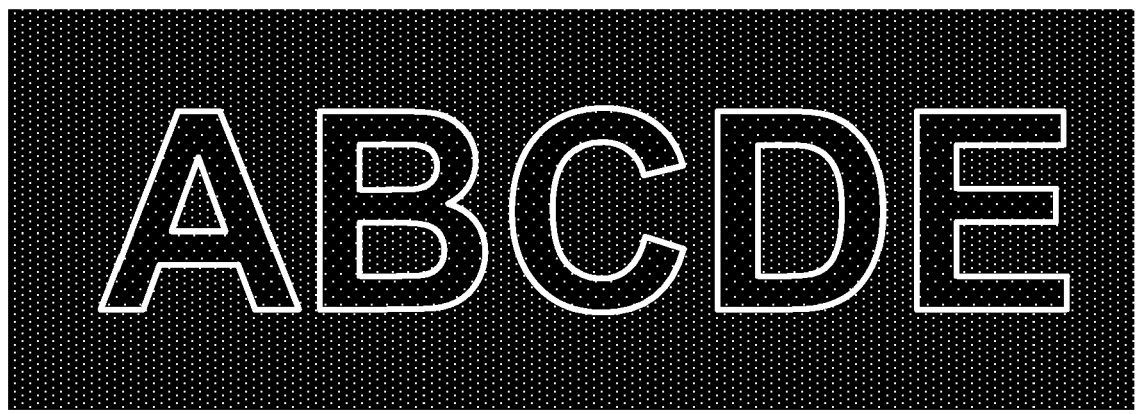
FIG. 18 illustrates a document after dithering and outlining, the dark text was outlined with a white color line to make it distinguishable from the dark background.

FIG. 16 illustrates a color optimization using monochrome patterns. The resulting patterns may have an intensity equal to or different from the intensity of the original colors. In FIG. 17 the background color was replaced with a monochrome pattern and the text was outlined with interrupted (dashed) lines. FIG. 18 illustrates a choice of white color for outlining the text in the document in the case of dark text on a dark background.

Figure 19:
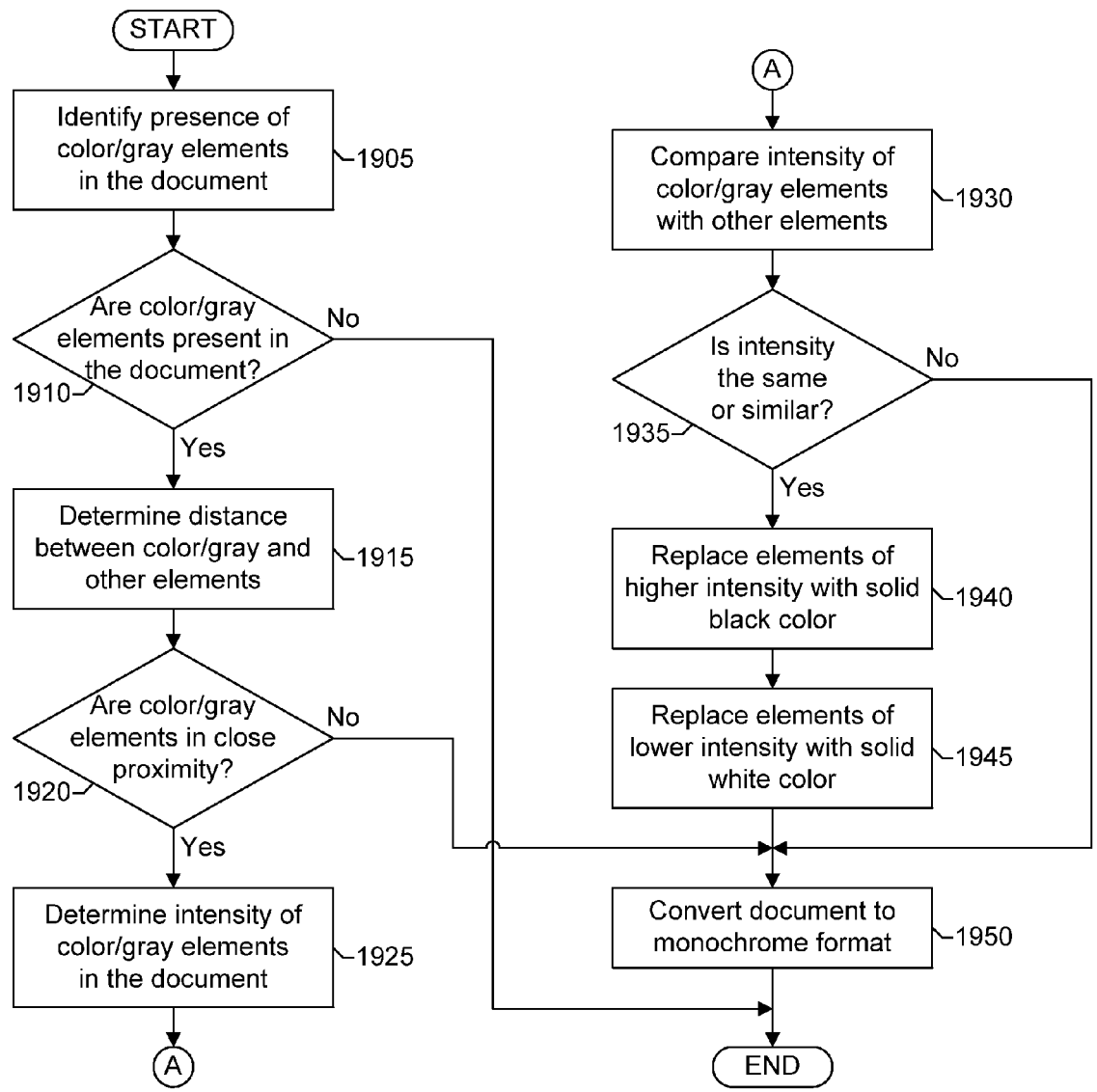
FIG. 19 is a flowchart illustrating a sample embodiment of the method of the present invention for color optimization by replacing original colors with solid monochrome colors.

A sample method of the present invention may include the steps illustrated in FIG. 19. The presence of a color (or shades of gray) element(s) in a document may be identified (Step 1905). The document may be a computer file, e.g. a text computer file (Microsoft Word, WordPerfect, PDF, etc.) or a graphical file (BMP, JPEG, GIF, TIFF, PNG, etc.). The document may be comprised of various elements. A text document may be comprised of elements such as text, graphics, objects, background, etc. A graphical document may be comprised of elements represented by areas of different colors and background.

If there are no color elements (Step 1910), then the method may be terminated. Otherwise, a distance(s) between the element(s) may be determined (Step 1915). If the color element(s) are not in close proximity to any other element(s) (Step 1920), then move to Step 1950. The close proximity may be determined based on a predefined value, e.g. if the distance between the color element and any other element is less than 3 pixels (or 2 mm, etc.), then the color element is in close proximity. If the color elements are not in close proximity, it is not likely that a person viewing the document after its conversion to monochrome would perceive those elements as a single element of the same color.

If the color element(s) are in close proximity (Step 1920), then the intensity of the color element(s) in the document may be determined (Step 1925). The intensity of monochrome elements is known (e.g. the elements of black color have maximum intensity and the elements of white color have minimum intensity). The intensity of the color element(s) may be compared with the intensity of any other element (Step 1930). If the intensity is not the same or similar (Step 1935), then continue at Step 1950. The similarity of intensity may be characterized by a predetermined threshold value, e.g. if the difference between intensity of two elements is less than 5%, then the intensity may be considered similar.

If elements of the same or similar intensity are in close proximity to any other element, then the elements of higher intensity may be replaced with a solid fore color (e.g. black) (Step 1940). Alternatively and/or additionally, the elements of lower intensity may be replaced with a background color (e.g. white) (Step 1945). Thus, closely located elements of similar intensity will become distinguishable in the resulting monochrome document (e.g. a light color element on the white background may be changed to the color black to make it more visible in the resulting monochrome document).

Alternatively, the elements of higher intensity may be replaced with a solid background color (e.g. white) and/or the elements of lower intensity may be replaced with a solid fore color (e.g. black). However, this may distort the document more than the color optimization described in Steps 1940 and 1945.

If the elements are of the same intensity, they (or one, or some of them) may be replaced with solid colors randomly or based on the additional rules.

Alternatively, the intensity of the color element(s) may be compared with a predetermined value or a predetermined interval, range, list of values, or any combination thereof. If the intensity of the color element is more/less/equal/within range/outside of the range/etc., then the element may be replaced with a solid monochrome color.

Further, the document may be converted to a monochrome format (Step 1950). Conventional methods may be used for the conversion of the remaining color elements to monochrome, such as dithering.

Figure 9:
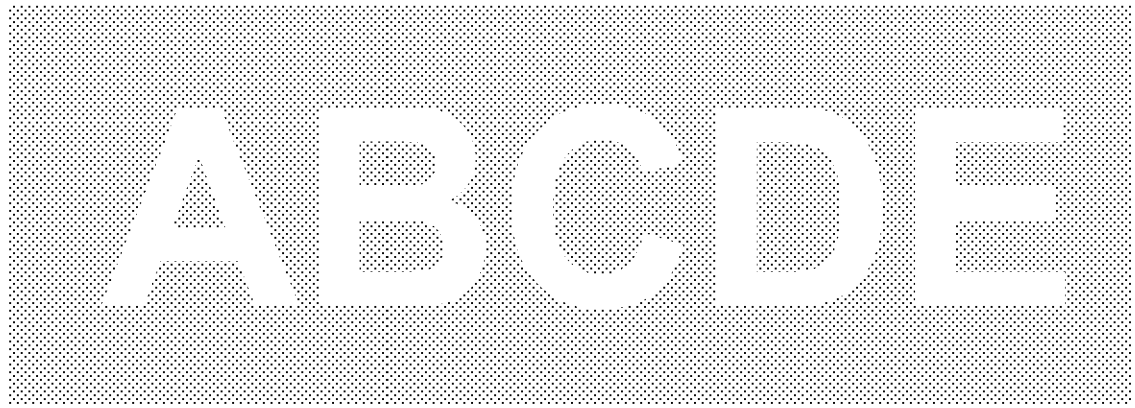
FIG. 9 illustrates a document after dithering with color optimization, where the text color was replaced with a solid white color.

Examples of the documents that could be created using the described method are shown in FIGS. 2, 8, 9, 12, and 13. In FIG. 2 two colored elements of the original document were replaced with solid monochrome colors (black and white), the third element was dithered using conventional methods. In FIG. 8 the colored text was replaced with the solid black color. In FIG. 9 the colored text was replaced with the solid white color. In FIG. 12 the colored background was replaced with the solid black color. In FIG. 13 the colored background was replaced with the solid white color.

Another sample method of the present invention may include the following steps. Open a document in Open Office. Open Office is a multi-platform open-source office suite. Iterate through all the text in the document, one character at a time. For each character: a) query Open Office for the color property, b) convert the color to HSB (Hue, Saturation, Brightness) encoding, c) if the brightness is less than 0.90 (or any other predetermined value), then change the color of the character to black, d) else, leave the character as is. Save and close the document in Open Office. Alternatively and/or additionally, the brightness may be compared to a predetermined interval (e.g. 0 to 0.9, 0.2 to 0.3, 0.7 to 1, etc.) or any combination of intervals.

Example of a programming code that may be used with the described method is shown below.

```
private static void doFontColorCorrection(XTextDocument xTextDocument) {
    XText xText = xTextDocument.getText( );
    XEnumeration xParagraphs;
    XEnumeration xTextPortions;
    int paragraphs = 0;
    double colorThreshold = ConfigHelper.getDoubleValue("Fax2Email", "DocumentConversionService", "fccThreshold");
    if (colorThreshold == Double.MIN_VALUE) {
        colorThreshold = 0.70;
    }
    log.debug("fccThreshold = " + colorThreshold);
    xParagraphs = getXEnumeration(xText);
    if (xParagraphs == null) {
        log.debug("xParagraphs is null -- no paragraphs?");
        return;
    }
    try {
        while (xParagraphs.hasMoreElements( )) {
            xTextPortions = getXEnumeration(xParagraphs.nextElement( ));
            if (xTextPortions == null) {
                log.debug("xTextPortions is null -- no text portions in this paragraph?");
            } else {
                while (xTextPortions.hasMoreElements( )) {
                    paragraphs++;
                    XPropertySet xTextPortionProps = (XPropertySet) UnoRuntime.queryInterface(XPropertySet.class,
                            xTextPortions.nextElement( ));
                    Object textPortionColorObj = xTextPortionProps.getPropertyValue("CharColor");
                    if (textPortionColorObj.getClass( ) == Integer.class) {
                        Color cc = new Color(((Integer) textPortionColorObj).intValue( ));
                        double whiteness = calculateWhiteness(cc);
                        if (whiteness < colorThreshold) {
                            log.debug("Setting color to black");
                            xTextPortionProps.setPropertyValue("CharColor", new Integer(0));
                        }
                    }
                }
            }
        }
    }
}
```

```
        } catch (Throwable thrown) {
            log.debug("Caught an error doing font color correction.", thrown);
        }
        log.debug("This document has " + paragraphs + " total text portions");
}
```

Figure 20:
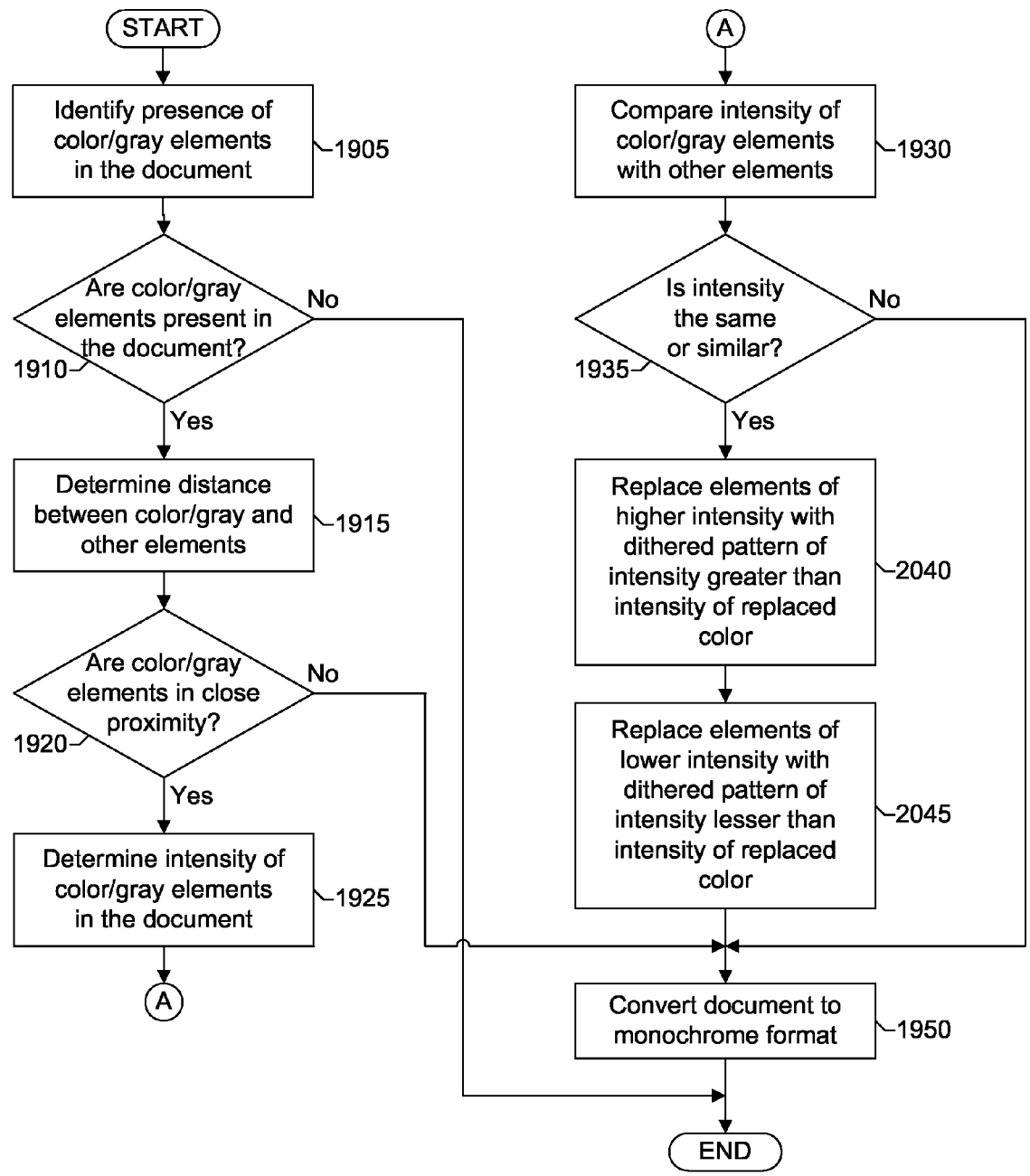
FIG. 20 is a flowchart illustrating a sample embodiment of the method of the present invention for color optimization by dithering original colors with surfaces of greater or lesser intensity.

Another sample method of the present invention may include the steps illustrated in FIG. 20. The presence of a color (or shades of gray) element(s) in a document may be identified (Step 1905). If there are no color elements (Step 1910), then the method may be terminated. Otherwise, a distance(s) between the element(s) may be determined (Step 1915). If the color elements are not in close proximity to any other element (Step 1920), then move to Step 1950. If the color elements are in close proximity (Step 1920), then the intensity of the color elements in the document may be determined (Step 1925). Further, the intensity of the color elements may be compared with the intensity of any other element (Step 1930). If the intensity is not the same or similar (Step 1935), then continue at Step 1950. If elements of the same or similar intensity (Step 1935) are in close proximity to any other element, then the elements of higher intensity may be replaced with a dithered surface of intensity greater than the intensity of the replaced color (Step 2040). Thus, a light color element on the white background may be changed to a dithered surface of greater intensity than the original color to make it more visible in the resulting monochrome document. Alternatively and/or additionally, the elements of lower intensity may be replaced with a dithered surface of intensity lesser than the intensity of the replaced color (Step 2045).

Alternatively, the elements of higher intensity may be replaced with a dithered surface of intensity lesser than the intensity of the replaced color and/or the elements of lower intensity may be replaced with a dithered surface of intensity greater than the intensity of the replaced color. However, this may distort the document more than the color optimization described in Steps 2040 and 2045.

If the elements are of the same intensity, they (or one, or some of them) may be replaced with the dithered surfaces of greater or lesser intensity than the original colors randomly or based on the additional rules.

Alternatively, the color elements may be replaced with monochrome patterns. The monochrome patterns may be of equal or different intensity compared to the original colors.

Alternatively, the intensity of the color element(s) may be compared with a predetermined value or a predetermined interval, range, list of values, or any combination thereof. If the intensity of the color element is more/less/equal/within range/outside of the range/etc., then the element may be replaced with a dithered surface or a monochrome pattern.

Further, the document may be converted to a monochrome format (Step 1950). Conventional methods may be used for the conversion of the remaining color elements to monochrome, such as dithering.

Examples of the documents that could be created using the described method are shown in FIGS. 3, 10, 11, and 16. In FIG. 3 two colored elements of the original document were replaced with dithered surfaces of greater and lesser intensity than the original colors and the third element was dithered using conventional methods. In FIG. 10 the colored text was replaced with a dithered surface of greater intensity than the original color. In FIG. 11 the colored text was replaced with a dithered surface of lesser intensity than the original color. In FIG. 16 the colored text and the colored background were replaced by monochrome patterns.

Figure 21:
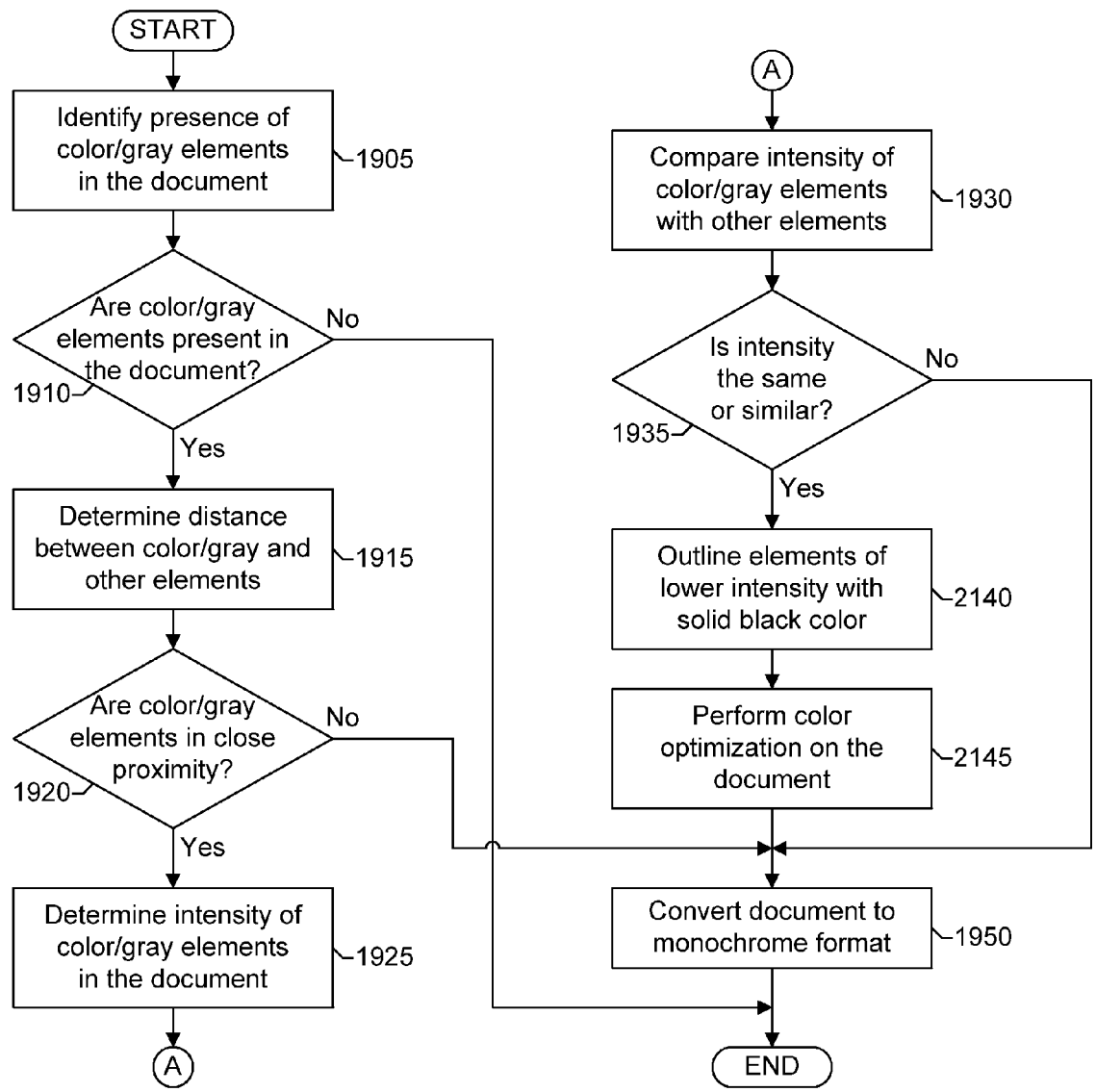
FIG. 21 is a flowchart illustrating a sample embodiment of the method of the present invention for comparing intensity of original colors and outlining document elements of lower intensity.

Another method of the present invention may include the steps illustrated in FIG. 21. The presence of a color (or shades of gray) element(s) in a document may be identified (Step 1905). If there are no color elements (Step 1910), then the method may be terminated. Otherwise, a distance(s) between the element(s) may be determined (Step 1915). If the color elements are not in close proximity to any other element (Step 1920), then move to Step 1950. If the color elements are in close proximity (Step 1920), then the intensity of the color elements in the document may be determined (Step 1925). Further, the intensity of the color elements may be compared with the intensity of any other element (Step 1930). If the intensity is not the same or similar (Step 1935), then continue at Step 1950. If elements of the same or similar intensity (Step 1935) are in close proximity to any other element, then outline elements of lower intensity with a solid fore color (e.g. black) (Step 2140).

Alternatively and/or additionally, the elements of lower intensity may be outlined with a solid background color (e.g. white), and/or the elements of higher intensity may be outlined with a solid fore color (e.g. black), and/or the elements of higher intensity may be outlined with a solid background color (e.g. white).

Alternatively and/or additionally, if the elements of similar intensity have intensity less than 0.5 (or another predetermined value) of the maximum intensity (e.g. maximum intensity correlates to color black), then outline one, some, or all of the elements with a color of maximum intensity (e.g. black). Thus, a light color element on the white background may be outlined to make it more visible in the resulting monochrome document.

Alternatively and/or additionally, if the elements of similar intensity have intensity greater than 0.5 (or another predetermined value) of the maximum intensity, then outline one, some, or all of the elements with a color of minimum intensity (e.g. white).

Alternatively and/or additionally, the elements may be outlined with non-solid lines, e.g. dotted lines, dashed lines, dash-dotted lines, etc.

Optionally, a color optimization process may be performed on the document (Step 2145). The color optimization may be performed using the methods described above.

If the elements are of the same intensity, one, some, or all of them may be chosen randomly or based on the additional rules to be outlined.

Alternatively, the intensity of the color element(s) may be compared with a predetermined value or a predetermined interval, range, list of values, or any combination thereof. If the intensity of the color element is more/less/equal/within range/outside of the range/etc., then the element may be outlined and/or color optimization may be performed.

Further, the document may be converted to a monochrome format (Step 1950). Conventional methods may be used for the conversion of the remaining color elements to monochrome, such as dithering.

Examples of the documents that could be created using the described method are shown in FIGS. 2, 4, 5, 14, and 15. In FIG. 2 a one colored element was outlined with a solid black line and two colored elements were color optimized (replaced with solid colors). In FIG. 4 all colored elements were outlined, no color optimization was performed. In FIG. 5 all colored elements were outlined and two colored elements were color optimized (replaced with dithered surfaces of greater or lesser intensity than original colors). In FIG. 14 text was outlined, no color optimization was performed. In FIG. 15 text was outlined and replaced with white color.

Figure 22:
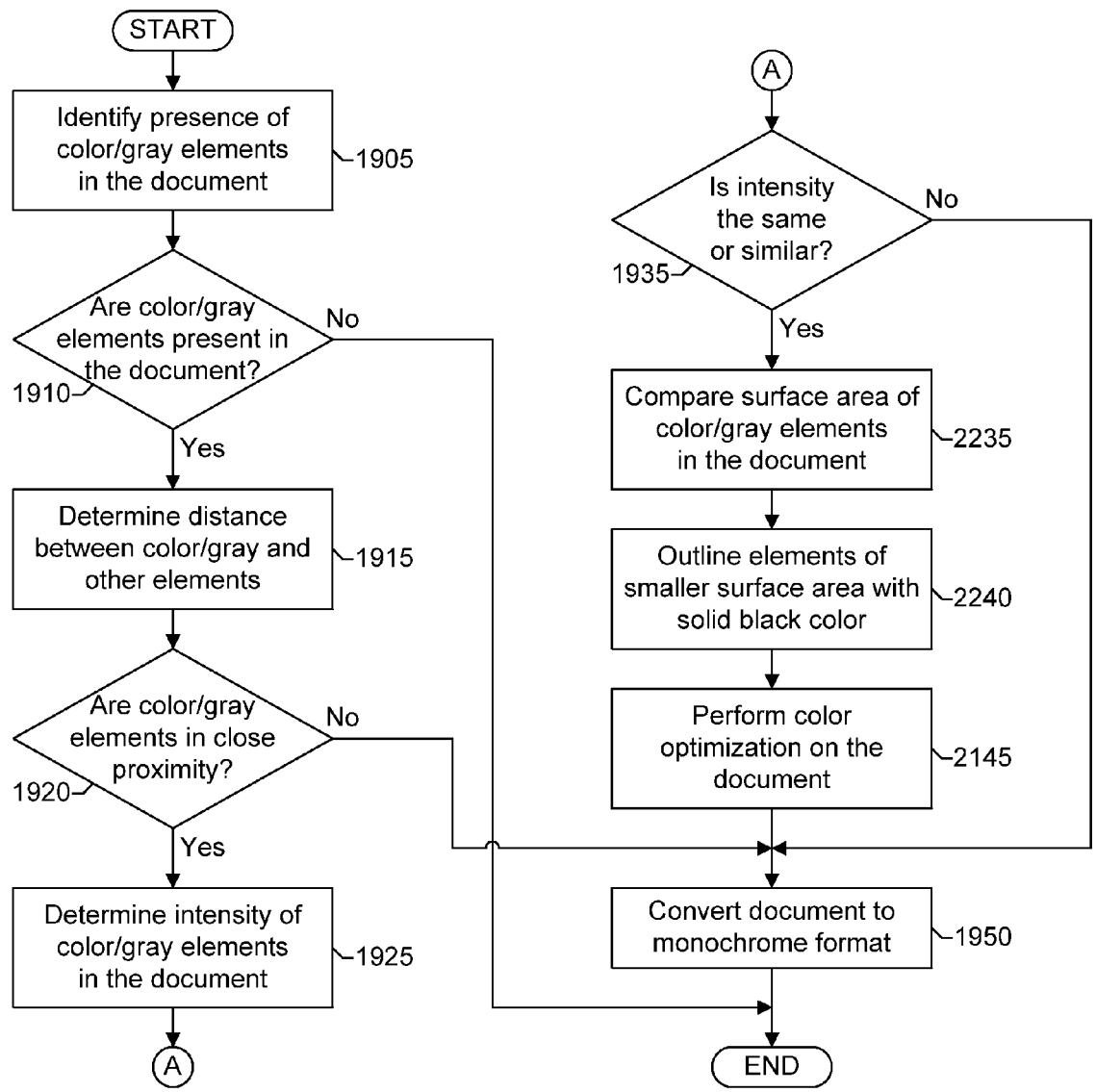
FIG. 22 is a flowchart illustrating a sample embodiment of the method of the present invention for comparing surface area of original colors and outlining document elements of smaller surface area.

Another method of the present invention may include the steps illustrated in FIG. 22. The presence of a color (or shades of gray) element(s) in a document may be identified (Step 1905). If there are no color element(s) (Step 1910), then the method may be terminated. Otherwise, a distance(s) between the element(s) may be determined in the document (Step 1915). If the color elements are not in close proximity to any other element (Step 1920), then move to Step 1950. If the color elements are in close proximity (Step 1920), then the intensity of the color elements in the document may be determined (Step 1925). Further, the intensity of the color elements may be compared with the intensity of any other element. If the intensity is not the same or similar (Step 1935), then continue at Step 1950. If the color elements of the same or similar intensity (Step 1935) are in close proximity to any other element, then measure and compare the surface area of the elements (Step 2235). Outline the elements of a smaller surface area with a solid fore color (e.g. black) (Step 2240).

Alternatively and/or additionally, the elements of a smaller surface area may be outlined with a solid background color (e.g. white), and/or the elements of a larger surface area may be outlined with a solid fore color (e.g. black), and/or the elements of a larger surface area may be outlined with a solid background color (e.g. white).

Alternatively and/or additionally, the elements may be outlined with non-solid lines, e.g. dotted lines, dashed lines, dash-dotted lines, etc.

Optionally, a color optimization process may be performed on the document (Step 2145). The color optimization may be performed using the methods described above.

If the elements are of the same surface area, one, some, or all of them may be chosen randomly or based on the additional rules to be outlined.

Alternatively, the intensity of the color element(s) may be compared with a predetermined value or a predetermined interval, range, list of values, or any combination thereof. If the intensity of the color element is more/less/equal/within range/outside of the range/etc., then the element may be outlined and/or color optimization may be performed.

Further, the document may be converted to a monochrome format (Step 1950). Conventional methods may be used for the conversion of the remaining color elements to monochrome, such as dithering.

The examples of the documents created by the described method are shown in FIGS. 14, 15, 17, and 18. In FIG. 14 text characters, being smaller surface area elements, were outlined, no color optimization was performed. In FIG. 15 text characters, being smaller surface area elements, were outlined and, as part of the color optimization, replaced with white color. In FIG. 17 text characters, being smaller surface area elements, were outlined with dashed lines and, as part of the color optimization, the background was replaced with a monochrome pattern. In FIG. 18 text characters, being smaller surface area elements, were outlined with larger width white color lines.

Figure 23:
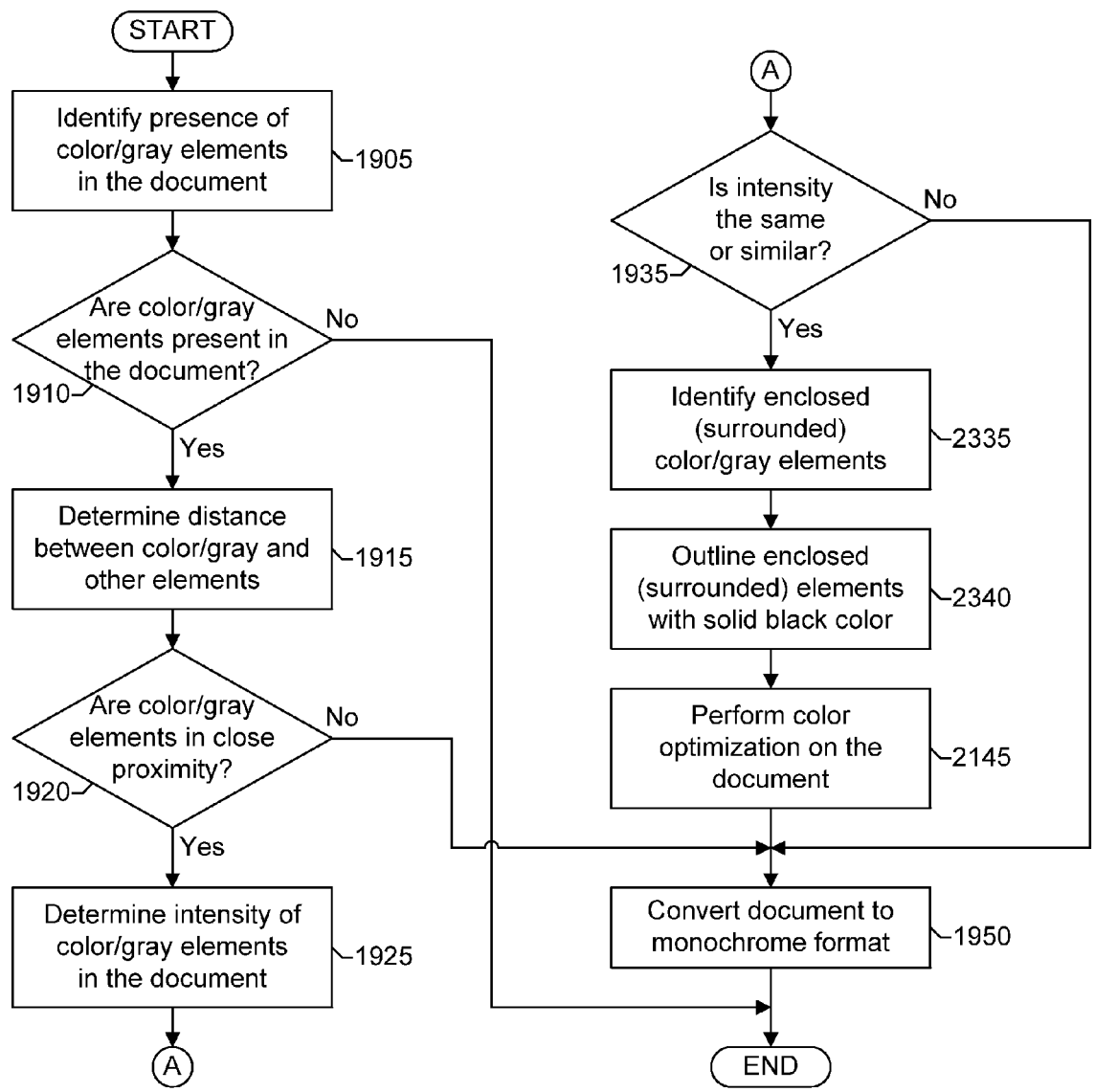
FIG. 23 is a flowchart illustrating a sample embodiment of the method of the present invention for identifying enclosed (surrounded) elements in the document and outlining them.

Another method of the present invention may include the steps illustrated in FIG. 23. The presence of a color (or shades of gray) element(s) in a document may be identified (Step 1905). If there are no color elements (Step 1910), then the method may be terminated. Otherwise, a distance(s) between the element(s) may be determined (Step 1915). If the color elements are not in close proximity to any other element (Step 1920), then move to Step 1950. If the color elements are in close proximity (Step 1920), then the intensity of the color elements in the document may be determined (Step 1925). Further, the intensity of the color elements may be compared with the intensity of any other element. If the intensity is not the same or similar (Step 1935), then continue at Step 1950. If elements of the same or similar intensity (Step 1935) are in close proximity to any other element, then identify enclosed (surrounded) elements (Step 2335). The enclosed elements are surrounded by element(s) of another color. Outline the enclosed elements with a solid fore color (e.g. black) (Step 2340).

Alternatively and/or additionally, the enclosed elements may be outlined with a solid background color (e.g. white). Alternatively and/or additionally, the elements may be outlined with non-solid lines, e.g. dotted lines, dashed lines, dash-dotted lines, etc.

Optionally, a color optimization process may be performed on the document (Step 2145). The color optimization may be performed using the methods described above.

Alternatively, the intensity of the color element(s) may be compared with a predetermined value or a predetermined interval, range, list of values, or any combination thereof. If the intensity of the color element is more/less/equal/within range/outside of the range/etc., then the element may be outlined and/or color optimization may be performed.

Further, the document may be converted to a monochrome format (Step 1950). Conventional methods may be used for the conversion of the remaining color elements to monochrome, such as dithering.

Examples of the documents that could be created using the described method are shown in FIGS. 14, 15, 17, and 18. In FIG. 14 text characters, being surrounded by the background, were outlined, no color optimization was performed. In FIG. 15 text characters, being surrounded by the background, were outlined and, as part of the color optimization, replaced with white color. In FIG. 17 text characters, being surrounded by the background, were outlined with dashed lines and, as part of the color optimization, the background was replaced with a monochrome pattern. In FIG. 18 text characters, being surrounded by the background, were outlined with larger width white color lines.

Figure 24:
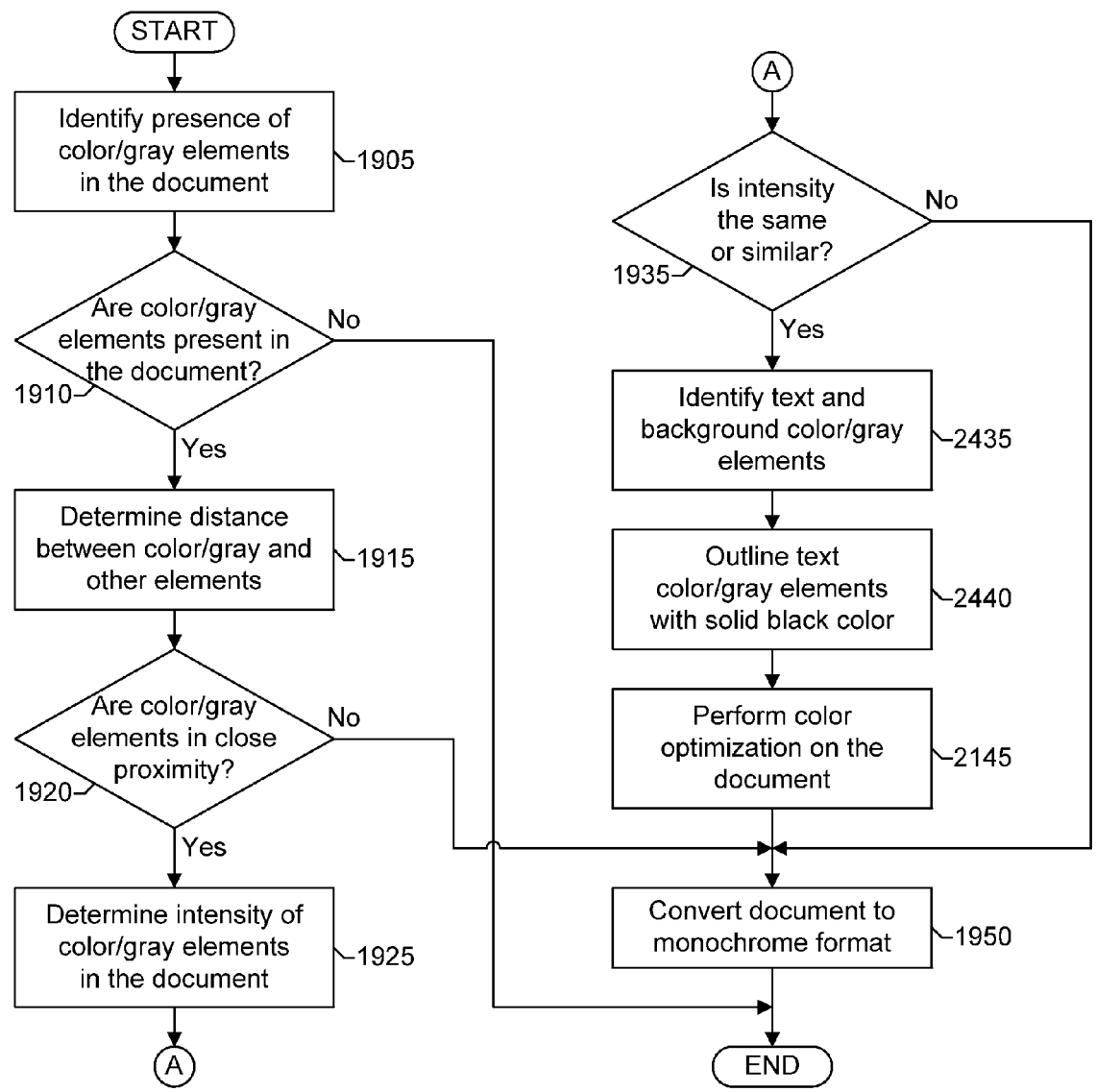
FIG. 24 is a flowchart illustrating a sample embodiment of the method of the present invention for identifying text and background elements in the document and outlining text elements.

Another method of the present invention may include the steps illustrated in FIG. 24. The presence of a color (or shades of gray) element(s) in a document may be identified (Step 1905). If there are no color elements (Step 1910), then the method may be terminated. Otherwise, a distance(s) between the element(s) may be determined (Step 1915). If the color elements are not in close proximity to any other element (Step 1920), then move to Step 1950. If the color elements are in close proximity (Step 1920), then the intensity of the color elements in the document may be determined (Step 1925). Further, the intensity of the color elements may be compared with the intensity of any other element. If the intensity is not the same or similar (Step 1935), then continue at Step 1950. If elements of the same or similar intensity (Step 1935) in close proximity to any other element are found, then identify text and background elements (Step 2435). Outline the text elements with a solid fore color (e.g. black) (Step 2440).

Alternatively and/or additionally, the text elements may be outlined with a solid background color (e.g. white). Alternatively and/or additionally, the elements may be outlined with non-solid lines, e.g. dotted lines, dashed lines, dash-dotted lines, etc.

Optionally, a color optimization process may be performed on the document (Step 2145). The color optimization may be performed using the methods described above.

Alternatively, the intensity of the color element(s) may be compared with a predetermined value or a predetermined interval, range, list of values, or any combination thereof. If the intensity of the color element is more/less/equal/within range/outside of the range/etc., then the element may be outlined and/or color optimization may be performed.

Further, the document may be converted to a monochrome format (Step 1950). Conventional methods may be used for the conversion of the remaining color elements to monochrome, such as dithering.

Examples of the documents that could be created using the described method are shown in FIGS. 14, 15, 17, and 18. In FIG. 14 text characters were outlined, no color optimization was performed. In FIG. 15 text characters were outlined and, as part of the color optimization, replaced with white color. In FIG. 17 text characters were outlined with dashed lines and, as part of the color optimization, the background was replaced with a monochrome pattern. In FIG. 18 text characters were outlined with larger width white color lines.

It is easier to perform color optimization and outlining on text documents than on graphics documents because the elements may be more easily identified. Thus, the described methods may have extensive applicability in Internet Fax technologies, where the sender provides a fax service provider with a text document to be faxed.

Figure 25:
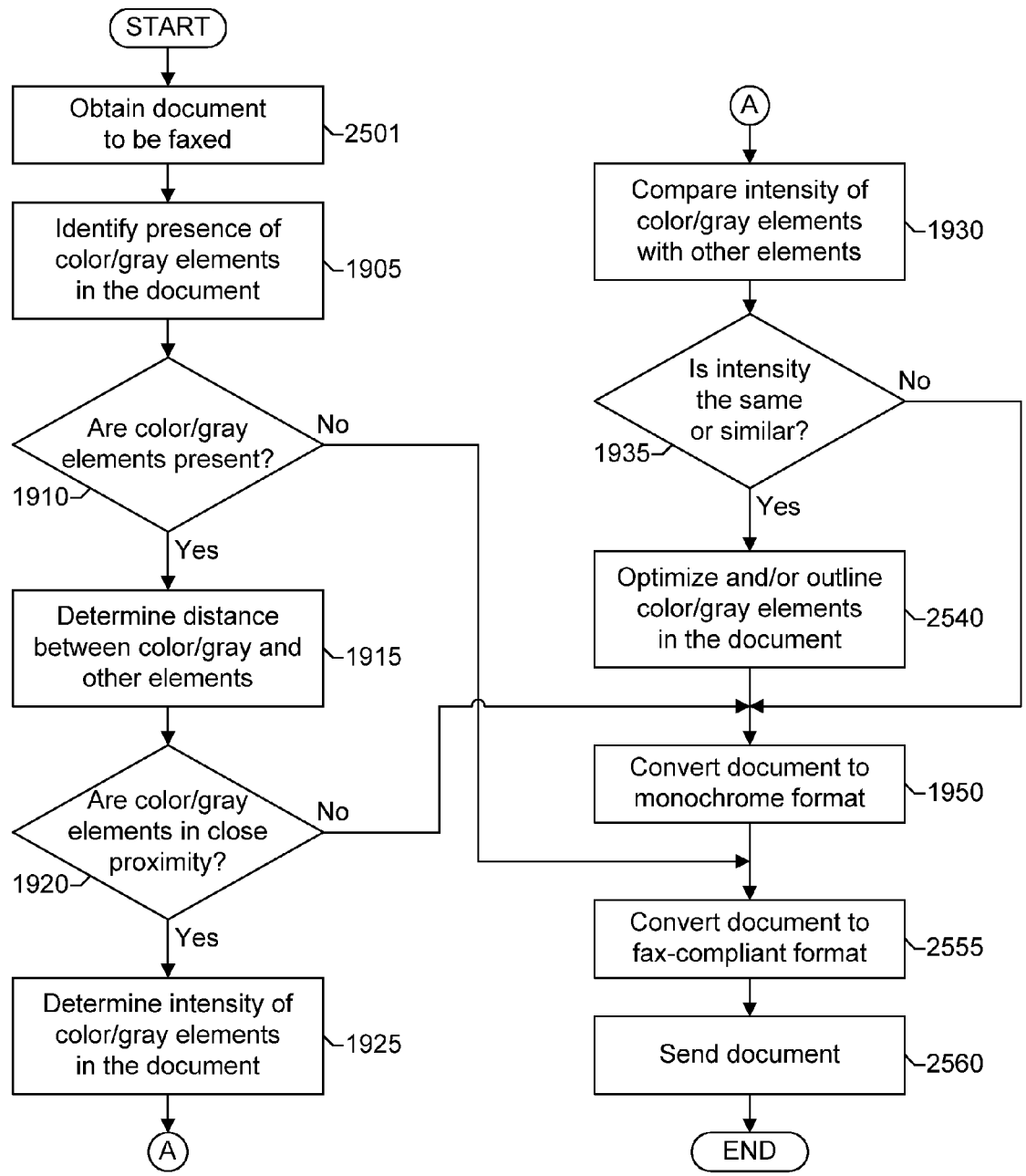
FIG. 25 is a flowchart illustrating a sample embodiment of the method of the present invention for sending a fax document with color optimization and outlining of document elements.

FIG. 25 illustrates a method for color optimization and/or outlining a fax document prior to sending. A document to be faxed may be obtained (Step 2501). The document may be obtained by a fax service provider from a sender via email, software, or a website. The presence of a color (or shades of gray) element(s) in a document may be identified (Step 1905). If there are no color elements (Step 1910), then continue at Step 2555. Otherwise, a distance(s) between the element(s) may be determined (Step 1915). If the color elements are not in close proximity to any other element (Step 1920), then move to Step 1950. If the color elements are in close proximity (Step 1920), then the intensity of the color elements in the document may be determined (Step 1925). Further, the intensity of the color elements may be compared with the intensity of any other element (Step 1930). If the intensity is not the same or similar (Step 1935), then continue at Step 1950. If elements of the same or similar intensity (Step 1935) are in close proximity to any other element, then optimize and/or outline the elements in the document (Step 2540). The elements may be optimized and/or outlined as described in the above methods.

Alternatively, the intensity of the color element(s) may be compared with a predetermined value or a predetermined interval, range, list of values, or any combination thereof. If the intensity of the color element is more/less/equal/within range/outside of the range/etc., then the element may be outlined and/or color optimization may be performed.

The document may be converted to a monochrome format (Step 1950). Conventional methods may be used for the conversion of the remaining color elements to monochrome, such as dithering.

The document may be converted to a fax-compliant format (Step 2555). The document may be converted to TIFF format. The document may be sent using known methods (Step 2560). The document may be sent via PSTN and Internet channels.

Figure 26:
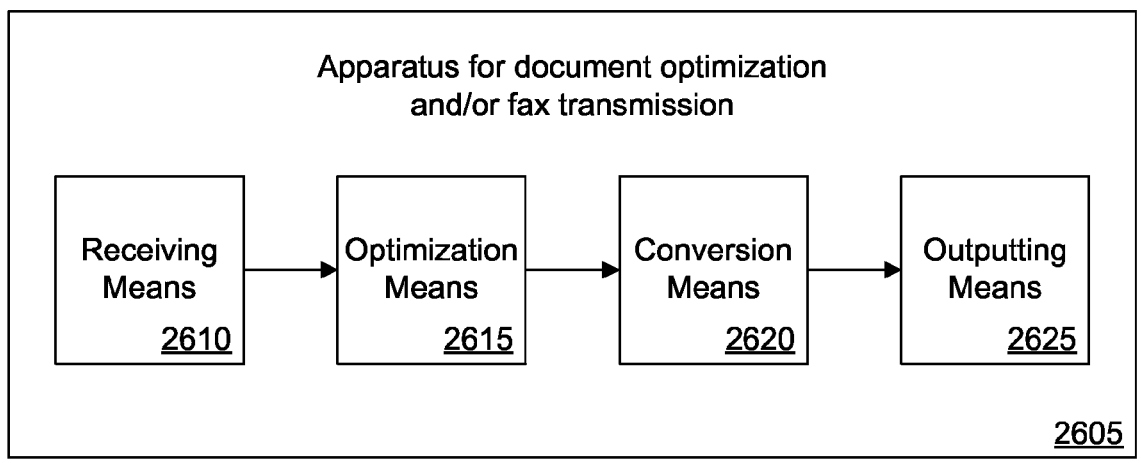
FIG. 26 is a block diagram illustrating a sample embodiment of the apparatus of the present invention.

FIG. 26 illustrates a sample embodiment of an apparatus of the present invention. An apparatus 2605 may include Receiving Means 2610, Optimization Means 2615, Conversion Means 2620, and Outputting Means 2625. The Receiving Means 2610 may be a set of electronic circuits designed for the purpose of obtaining a document. The Optimization Means 2615 may be a set of electronic circuits designed for the purpose of optimizing the document using the methods described above. The Conversion Means 2620 may be a set of electronic circuits designed for the purpose of converting the document to a monochrome format and/or a fax-compliant format. The Outputting Means 2625 may be a set of electronic circuits designed for the purpose of outputting the document. The Outputting Means 2625 may provide, inter alia, printing and/or sending functionality. Any of the Receiving Means 2610, the Optimization Means 2615, the Conversion Means 2620, and the Outputting Means 2625 may be implemented on the same set of electronic circuits, such as a microprocessor.

If the document is supplied to the Apparatus 2605 as a hard copy, the Receiving Means 2610 may provide scanning functionality for creating an electronic document from the hard copy.

The Apparatus 2605 may be a computer, a fax machine, or another device programmed to perform the methods described above. The Apparatus 2605 may be located on a client side (e.g. originator's side) or on a server side (e.g. fax service provider).

Figure 27:
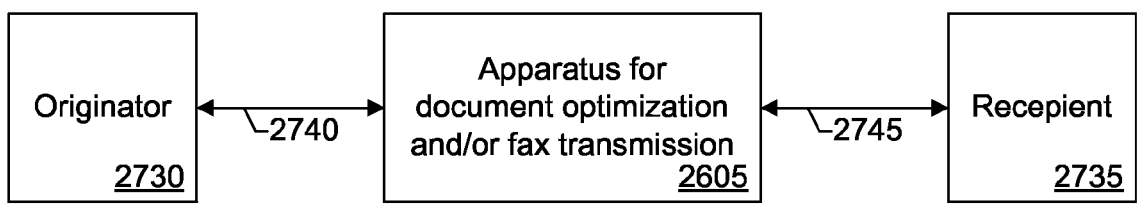
FIG. 27 is a block diagram illustrating a sample embodiment of the system utilizing the apparatus of FIG. 26.

FIG. 27 illustrates a sample embodiment of a system utilizing the apparatus described above. The system may include an Originator 2730, an Apparatus 2605, and a Recipient 2735. The Apparatus 2605 is a device as described in FIG. 26. The Originator 2730 may be an individual, a device, a computer, or any other means that serve as a source of a document to be processed by the Apparatus 2605. The Originator 2730 is coupled with the Apparatus 2605 via a Communication Link 2740. The Communication Link 2740 may be a computer network connection, a telephonic connection, or a mechanical means, such as loading tray of a fax machine. The Recipient 2735 may be an individual, a device, a computer, or any other means that serve as a destination for the document processed by the Apparatus 2605. The Recipient 2735 is coupled with the Apparatus 2605 via a Communication Link 2745. The Communication Link 2745 may be a computer network connection, a telephonic connection, or a mechanical means, such as receiving tray of a fax machine. The computer network connection may be the Internet connection.

The Originator 2730 and the Recipient 2735 may be the same entity, e.g. a user may provide the document for optimization to the Apparatus 2605 and receive back the resulting document.

Figure 28:
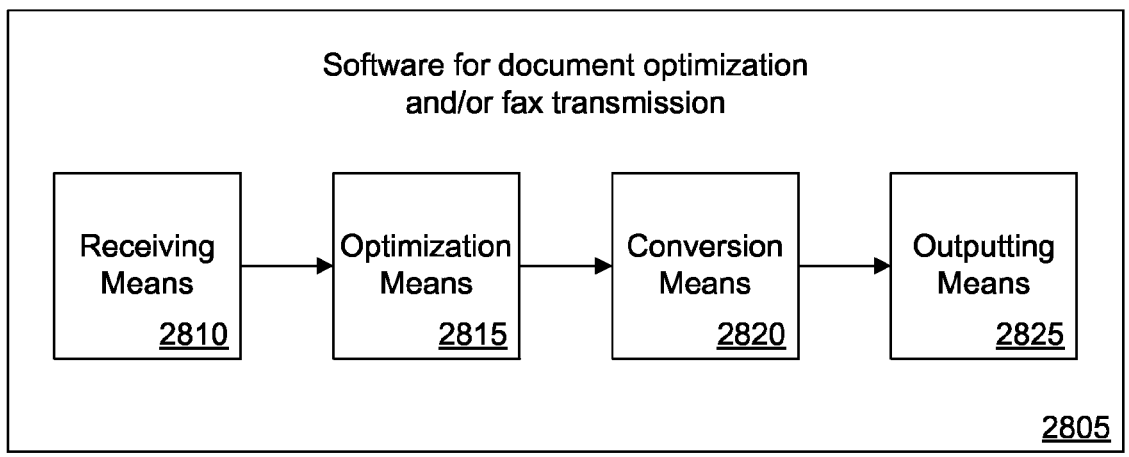
FIG. 28 is a block diagram illustrating a sample embodiment of the software of the present invention.

FIG. 28 illustrates a sample embodiment of a software of the present invention. A Software 2805 may include Receiving Means 2810, Optimization Means 2815, Conversion Means 2820, and Outputting Means 2825. The Receiving Means 2810 may be a set of machine-readable instructions for obtaining a document. The Optimization Means 2815 may be a set of machine-readable instructions for optimizing the document using the methods described above. The Conversion Means 2820 may be a set of machine-readable instructions for converting the document to a monochrome format and/or a fax-compliant format. The Outputting Means 2825 may be a set of machine-readable instructions for outputting the document. The Outputting Means 2825 may provide, inter alia, printing and/or sending functionality. Any of the Receiving Means 2810, the Optimization Means 2815, the Conversion Means 2820, and the Outputting Means 2825 may be implemented in the same set of machine-readable instructions.

The Software 2805 may be executed on a computer, a fax machine, or another device. The Software 2805 may be located on a client side (e.g. originator's side) or on a server side (e.g. fax service provider).

Figure 29:
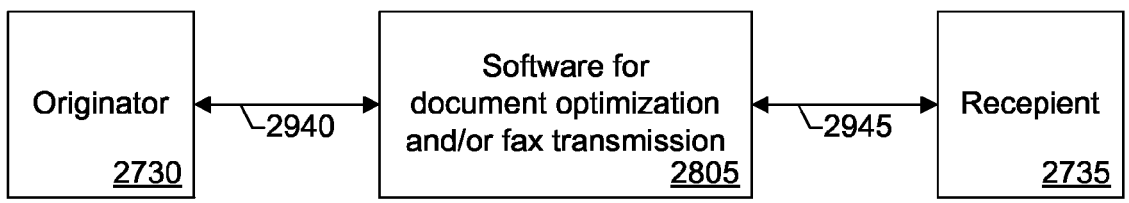
FIG. 29 is a block diagram illustrating a sample embodiment of the system utilizing the software of FIG. 28.

FIG. 29 illustrates a sample embodiment of a system utilizing the software described above. The system may include an Originator 2730, a Software 2805, and a Recipient 2735. The Software 2805 is described above in FIG. 28. The Originator 2730 may be an individual, a device, a computer, or any other means that serve as a source of a document to be processed by the Software 2805. The Originator 2730 is coupled with the Software 2805 via a Communication Link 2940. The Communication Link 2940 may be a computer network connection, a telephonic connection, or a user interface. The Recipient 2735 may be an individual, a device, a computer, or any other means that serve as a destination for the document processed by the Software 2805. The Recipient 2735 is coupled with the Software 2805 via a Communication Link 2945. The Communication Link 2945 may be a computer network connection, a telephonic connection, or a user interface. The computer network connection may be the Internet connection.

The Originator 2730 and the Recipient 2735 may be the same entity, e.g. a user may provide the document for optimization to the Software 2805 and receive back the resulting document.

The described apparatus, software, and systems may provide users with additional features, such as settings/selection of what type of optimization may be performed on a document, parameters for optimization, preview of optimized document, etc.

The described methods, apparatus, software, and systems may be used for document optimization intended for color-blind people.

Other embodiments and uses of this invention will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The elements described in this specification and in the claims in plural form may also be construed as singular, unless specifically stated otherwise. The elements described in this specification and in the claims in singular form may also be construed as plural, unless specifically stated otherwise.

The Abstract accompanying this specification is provided to enable the United States Patent and Trademark Office and the public generally to determine quickly from a cursory inspection the nature and gist of the technical disclosure and is in no way intended for defining, determining, or limiting the present invention or any of its embodiments.

What is claimed is:

1. A method for optimization of an electronic document, comprising the steps of:
    a) determining a first intensity and a first color channel component of a first color element and determining a second intensity and a second color channel component of a second element in a document,
    b) comparing said first intensity with said second intensity in said document,
    c) comparing said first color channel component with said second color channel component in said document, and
    d) if said first color channel component varies from said second color channel component and a difference between said first intensity and said second intensity is less than 5%, then replacing a color of at least one of said elements with a monochrome pattern.

2. The method of claim 1, further comprising a step of:
    e) prior to step a), identifying a presence of said first color element in said document.

3. The method of claim 2, further comprising a step of:
    f) if identifying said presence of said first color element in said document indicates that no said first color element is present in said document, then exiting the method.

4. The method of claim 1, further comprising a step of:
    e) determining a distance between said first color element and said second element in said document.

5. The method of claim 4, further comprising a step of:
    f) if said distance between said first color element and said second element in said document is more than a predetermined distance value, then exiting the method.

6. The method of claim 1, wherein said document is a text document.

7. The method of claim 6, wherein said text document comprises elements selected from the group consisting of text, graphics, objects, and background.

8. The method of claim 1, wherein said document is a graphics document.

9. The method of claim 1, wherein said first color element is a text element.

10. The method of claim 1, wherein said second element is a background element.

11. The method of claim 1, wherein step d) further comprising a step of:
    e) replacing a color of said first color element with said monochrome pattern of intensity equal to said first intensity.

12. The method of claim 1, wherein step d) further comprising a step of:
    e) replacing a color of said first color element with said monochrome pattern of intensity not equal to said first intensity.

13. The method of claim 1, wherein said monochrome pattern is selected from the group consisting of vertical lines, horizontal lines, diagonal lines, and cross-lines.

14. The method of claim 1, wherein said monochrome pattern comprises lines selected from the group consisting of solid lines, dotted lines, and dashed lines.

15. The method of claim 1, wherein step d) further comprising a step of:
    e) if said first intensity is lower than said second intensity, then replacing a color of said first color element with said monochrome pattern of intensity lesser than said first intensity.

16. The method of claim 1, wherein step d) further comprising a step of:
    e) if said first intensity is higher than said second intensity, then replacing a color of said first color element with said monochrome pattern of intensity greater than said first intensity.

17. The method of claim 1, further comprising a step of:
    e) outlining said first color element.

18. The method of claim 17, wherein outlining is performed using lines selected from the group consisting of solid lines, dotted lines, and dashed lines.

19. The method of claim 17, wherein a color for outlining is chosen based on said first intensity and/or based on said second intensity.

20. The method of claim 17, wherein if said first intensity is lower than said second intensity, then outlining is performed using black lines.

21. The method of claim 17, wherein if said first intensity is higher than said second intensity, then outlining is performed using white lines.

22. The method of claim 17, wherein if said first intensity is lower than a predetermined value of a maximum intensity and said second intensity is lower than said predetermined value of said maximum intensity, then outlining is performed using lines of said maximum intensity.

23. The method of claim 22, wherein said predetermined value of said maximum intensity equals 0.5.

24. The method of claim 17, wherein if said first intensity is higher than a predetermined value of a maximum intensity and said second intensity is higher than said predetermined value of said maximum intensity, then outlining is performed using lines of a minimum intensity.

25. The method of claim 24, wherein said predetermined value of said maximum intensity equals 0.5.

26. The method of claim 1, further comprising steps of:
e) measuring a surface area of said first color element,
f) measuring a surface area of said second element, and
g) comparing said surface area of said first color element and said surface area of said second element.

27. The method of claim 26, further comprising a step of:
h) if said surface area of said first color element is smaller than said surface area of said second element, then outlining said first color element.

28. The method of claim 26, further comprising a step of:
h) if said surface area of said first color element is larger than said surface area of said second element, then outlining said first color element.

29. The method of claim 1, further comprising a step of:
e) identifying whether said first color element is enclosed by said second element, and
f) if said first color element is enclosed by said second element, then outlining said first color element.

30. The method of claim 1, further comprising a step of:
e) identifying whether said first color element is a text element, and
f) if said first color element is said text element, then outlining said first color element.

31. The method of claim 1, wherein said document is a document to be faxed.

32. The method of claim 1, further comprising a step of:
e) obtaining said document.

33. The method of claim 1, further comprising a step of:
e) converting said document to a monochrome format.

34. The method of claim 1, further comprising a step of:
e) converting said document to a fax-compliant format.

35. The method of claim 34, further comprising a step of:
f) sending said document.

36. The method of claim 1, further comprising a step of:
e) repeating steps a) through d) for another color element.

37. A method for optimization of an electronic document, comprising the steps of:
a) comparing intensities and color channel components of elements in a document, and
b) if said color channel components vary and a difference between said intensities is less than 5%, then replacing a color of at least one of the elements with a monochrome pattern.

38. The method of claim 37, further comprising a step of:
c) converting said document to a monochrome format.

39. A method for optimization of an electronic document, comprising the steps of:
a) identifying an intensity of a color element in a document, and
b) if said intensity is greater than a predetermined value, then replacing a color of said color element with a monochrome pattern and outlining said color element.

40. The method of claim 39, further comprising a step of:
c) converting said document to a monochrome format.

41. A method for optimization of an electronic document, comprising the steps of:
a) identifying an intensity of a color element in a document, and
b) if said intensity is less than a predetermined value, then replacing a color of said color element with a monochrome pattern and outlining said color element.

42. The method of claim 41, further comprising a step of:
c) converting said document to a monochrome format.

43. An apparatus for optimization of a document, comprising:
a) an Optimization Means enabling the apparatus to:
i) compare intensities and color channel components of elements in a document, and
ii) if said color channel components vary and a difference between said intensities is less than 5%, then replace a color of at least one of the elements with a monochrome pattern.

44. The apparatus of claim 43, further comprising:
b) a Receiving Means for receiving said document.

45. The apparatus of claim 43, further comprising:
b) a Conversion Means for converting said document to another format.

46. The apparatus of claim 43, further comprising:
b) an Outputting Means for outputting said document.

47. An apparatus for optimization of a document, comprising:
a) an Optimization Means enabling the apparatus to:
i) identify an intensity of a color element in a document, and
ii) if said intensity is within a predetermined interval, then replace a color of said color element with a monochrome pattern and outline said color element.

48. The apparatus of claim 47, further comprising:
b) a Receiving Means for receiving said document.

49. The apparatus of claim 47, further comprising:
b) a Conversion Means for converting said document to another format.

50. The apparatus of claim 47, further comprising:
b) an Outputting Means for outputting said document.

51. An article of manufacture implemented on a computer readable medium for optimization of a document, comprising:
a) an Optimization Means enabling the article of manufacture to:
i) compare intensities and color channel components of elements in a document, and
ii) if said color channel components vary and a difference between said intensities is less than 5%, then replace a color of at least one of the elements with a monochrome pattern.

52. The article of manufacture of claim 51, further comprising:
b) a Receiving Means for receiving said document.

53. The article of manufacture of claim 51, further comprising:
  b) a Conversion Means for converting said document to another format.

54. The article of manufacture of claim 51, further comprising:
  b) an Outputting Means for outputting said document.

55. An article of manufacture implemented on a computer readable medium for optimization of a document, comprising:
  a) an Optimization Means enabling the article of manufacture to:
    i) identify an intensity of a color element in a document, and
    ii) if said intensity is within a predetermined interval, then replace a color of said color element with a monochrome pattern and outline said color element.

56. The article of manufacture of claim 55, further comprising:
  b) a Receiving Means for receiving said document.

57. The article of manufacture of claim 55, further comprising:
  b) a Conversion Means for converting said document to another format.

58. The article of manufacture of claim 55, further comprising:
  b) an Outputting Means for outputting said document.

* * * * *